(12) United States Patent
Kondo et al.

(10) Patent No.: US 6,611,562 B1
(45) Date of Patent: Aug. 26, 2003

(54) IMAGE PROCESSING DEVICE AND IMAGE PROCESSING METHOD, AND COMPUTER-READABLE RECORDED MEDIUM

(75) Inventors: Tetsujiro Kondo, Tokyo (JP); Kenji Tanaka, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/600,899

(22) PCT Filed: Nov. 25, 1999

(86) PCT No.: PCT/JP99/06585

§ 371 (c)(1),
(2), (4) Date: Sep. 22, 2000

(87) PCT Pub. No.: WO00/31688

PCT Pub. Date: Jun. 2, 2000

(30) Foreign Application Priority Data

Nov. 25, 1998 (JP) ............................................ 10-350770

(51) Int. Cl.⁷ ................................................ H04N 7/18
(52) U.S. Cl. ............................ 375/240.27; 375/240.08; 375/240.09
(58) Field of Search ........................ 375/240.08–240.29

(56) References Cited

U.S. PATENT DOCUMENTS

| 5,757,422 A | * | 5/1998 | Matsumura | .................. | 348/169 |
| 5,838,828 A | | 11/1998 | Mizuki et al. | | |
| 6,078,618 A | * | 6/2000 | Yokoyama et al. | .......... | 375/240 |
| 6,078,726 A | * | 6/2000 | Gotoh et al. | ................. | 386/117 |

FOREIGN PATENT DOCUMENTS

| JP | 6-168328 | 6/1994 |
| JP | 08263666 | 10/1996 |
| JP | 9-50526 | 2/1997 |
| JP | 09147124 | 6/1997 |
| JP | 10069545 | 3/1998 |

* cited by examiner

*Primary Examiner*—Andy Rao
(74) *Attorney, Agent, or Firm*—Frommer Lawrence & Haug LLP; William S. Frommer

(57) ABSTRACT

An information processing apparatus may be for use in dividing an image area to extract objects. Frequency related information generating sections (112, 113) may generate frequency related information related to frequencies of respective pixel values based on pixel values of a plurality of pixels comprising an original image and error information. A representative value deciding section (114) may decide a representative value of a pixel value based on the frequency related information. An accumulating section (115) may accumulate the representative value. A replacing section (116) may replace the pixel values of a plurality of pixels comprising the original image with the representative values accumulated in the accumulated section (115), and may store the replaced representative values in a memory (117) as an outputted image. An error information generating section (118) may generate error information indicative of errors between the pixel values of the outputted image of the replacing section (116) and the pixel values of the original image. A control section 110A may control the respective sections such that the processing of the respective section s may be executed repeatedly until the error may become less than a threshold value. When the operation is ended, the outputted image comprising a plurality of areas whose pixel values are made the same may be stored in the frame memory 117.

35 Claims, 27 Drawing Sheets

F I G. 2 0
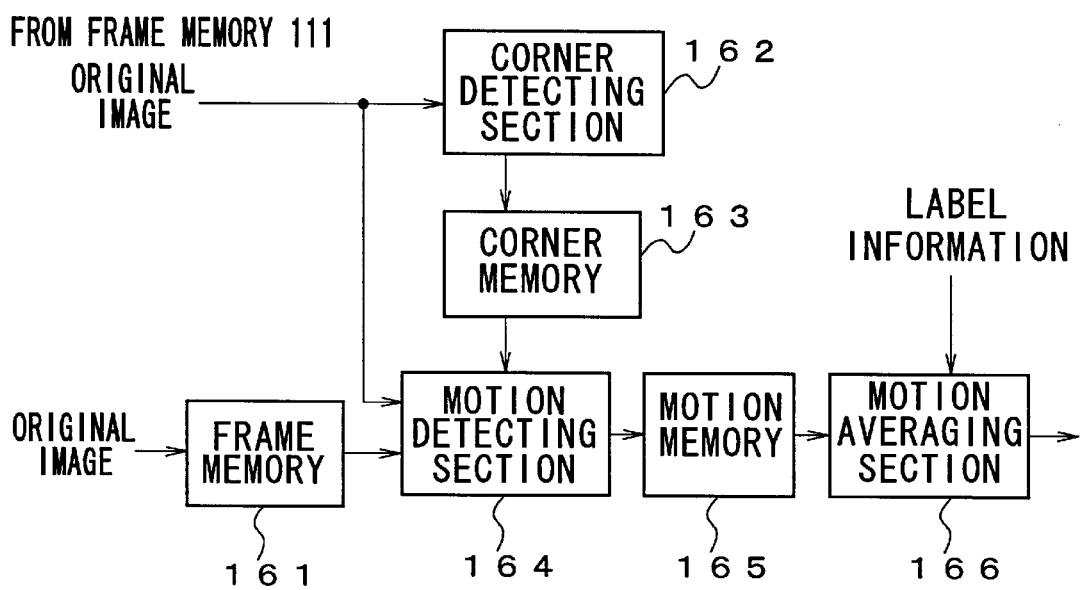

| -1 | 0 | 1 |
|---|---|---|
| -2 | 0 | 2 |
| -1 | 0 | 1 |

| -1 | -2 | -1 |
|---|---|---|
| 0 | 0 | 0 |
| 1 | 2 | 1 |

IMAGE PROCESSING DEVICE AND IMAGE PROCESSING METHOD, AND COMPUTER-READABLE RECORDED MEDIUM

TECHNICAL FIELD

This invention relates to an image processing apparatus and an image processing method in which an image area is divided in order to extract an object or to effect an image compression or the like utilizing a motion compensation of every object and a recording medium readable by a computer, for example.

BACKGROUND ART

According to a snake which is one of the image area dividing methods (object detection methods), it is possible to approximately estimate position and shape of an object by fitting a closed curve, which is deformed geometrically, into an object (see Japanese laid-open patent application No. 9-50526)

Also, as other area dividing methods, there is known a method in which edges are extracted from an image and a scope encircled by the edges can be set to the area.

However, according to the former method, a processing for executing the initialization cannot be automated without difficulty. Moreover, there arises a problem that only an object of a simple shape can be detected.

Furthermore, the latter method encounters with a problem that although an object of a complex shape can be detected, a gradational object whose edges are not clear cannot be detected accurately.

It is an object of this invention to provide an image processing apparatus and the like in which areas of complex shape and whose edges are not clear can be detected with high accuracy.

DISCLOSURE OF INVENTION

An image processing apparatus according to this invention comprises a frequency related information generating section for generating frequency related information relating to a frequency of each pixel value based on pixels values of a plurality of pixels comprising an original image and error information, a representative value deciding section for deciding a representative value of pixel values based on the frequency related information, an accumulating section for accumulating a representative value decided by the representative value deciding section, a replacing section for replacing the pixel values of a plurality of pixels comprising the original image with the representative values accumulated in the accumulating section, an error information generating section for generating an error between pixel values of respective pixels of an outputted image of the replacing section and pixel values of a plurality of pixels comprising the original image and a control section for controlling the frequency related information generating section, the representative value deciding section, the accumulating section, the replacing section and the error information generating section such that these sections may be operated repeatedly until a predetermined condition is satisfied.

An image processing method according to this invention comprises the steps of generating frequency related information related to frequencies of respective pixel values based on pixel values of a plurality of pixels comprising an original image and error information, deciding a representative value of a pixel value based on the frequency related information, accumulating the decided representative value, replacing pixel values of a plurality of pixels comprising the original image with the accumulated representative values, generating the error information indicative of errors between pixel values of respective pixels of an outputted image obtained by the replacement and pixel values of a plurality of pixels comprising the original image and controlling the frequency related information generation step, the representative value deciding step, the representative value accumulating step, the representative value replacing step and the error information generating step such that the respective steps may be executed repeatedly until a predetermined condition is satisfied.

A computer-readable-recording medium for recording thereon a program for enabling a computer to execute the steps of generating frequency related information related to frequencies of respective pixels based on pixel values of a plurality of pixels comprising an original image and error information, deciding a representative value of a pixel value based on the frequency related information, accumulating the decided representative value, replacing the pixel values of a plurality of pixels comprising the original image with the accumulated representative values, generating the error information for indicating errors between the pixel values of respective pixels of an outputted image obtained by the replacement and the pixel values of a plurality of pixels comprising the original image and controlling the frequency related information generating step, the representative value deciding step, the representative value accumulating step, the representative value replacing step and the error information generating step such that these steps may be repeatedly executed until a predetermined condition is satisfied.

In this invention, frequency related information related to frequencies of respective pixel values may be generated based on pixel values of a plurality of pixels comprising an original image and error information. For example, in the first operation of the repetitive operations, the frequency related information may be generated based on only the pixel values of a plurality of pixels. In the operation following the second operation in the repetitive operations, the frequency related information may be generated based on both of the pixel values of a plurality of pixels and error information. Moreover, for example, frequencies of pixel values of a plurality of pixels comprising the original image may be detected from all available pixel values of the original image, and the frequency related information may be generated by multiplying this frequency with the errors corresponding to the respective pixel values contained in the error information at every corresponding pixel value.

Then, a representative value of a pixel value may be decided based on the frequency related information thus generated. The representative value thus decided may be accumulated, and the pixel values of a plurality of pixels comprising the original image may be replaced with the representative values thus accumulated. For example, the pixel values of the respective pixels comprising the original image may be replaced with a representative value having a minimum error of at least one accumulated representative value, and thereby an outputted image may be obtained.

Error information used when the frequency related information is generated may be generated by detecting errors between pixel values of all available pixel values of the original image, for example, and the accumulated representative values. Moreover, for example, error information may be obtained by detecting errors between the pixel values of the respective pixels of the outputted image obtained by the replacement and the pixel values of the respective pixels of the original image.

Then, the operation for generating the frequency related information, the operation for deciding the representative value, the operation for accumulating the representative value and the operation for replacing the pixel values of a plurality of pixels comprising the original image with the representative value may be repeatedly executed until a predetermined condition is satisfied. The predetermined condition may be such one that the maximum value of the errors contained in the error information, for example, may be less than a threshold value or that the number of the repetitive operations may become greater than a threshold value. A series of the above-mentioned operations may be repeated, whereby the outputted image comprising a plurality of areas in which the pixel values of pixels within each area are the same may be obtained. According to this invention, the area having a complex shape and whose edges are not clear can be divided with high accuracy.

BRIEF DESCRIPTION OF DRAWINGS

FIG. 20 is a diagram showing an example of an arrangement of a motion detecting/averaging section.

BEST MODE FOR CARRYING OUT THE INVENTION

Figure 1:
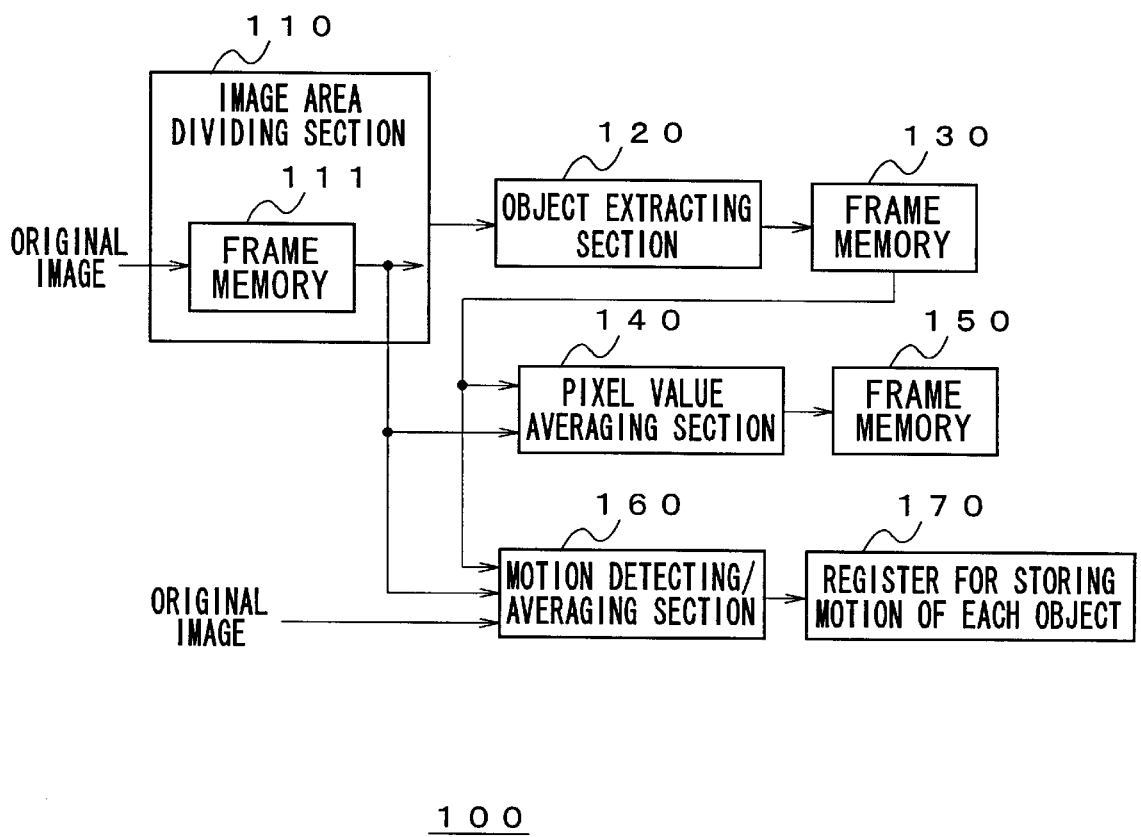
FIG. 1 is a block diagram showing an arrangement of an image processing apparatus according to an embodiment.

FIG. 1 shows an arrangement of an image processing apparatus 100 according to a first embodiment.

This image processing apparatus 100 may include an image area dividing section 110 for obtaining an outputted image comprising a plurality of areas having pixels whose pixels values are made the same within each area by processing an original image, an object extracting section 120 for extracting set of adjacent pixels having the same pixel value as objects by processing the outputted image obtained from this image area dividing section 110 and a frame memory 130 for storing therein information (label information) indicating a plurality of objects extracted by the object extracting section 120 to which pixels of the original image belong, respectively.

The image processing apparatus 100 may also include a pixel value averaging section 140 for calculating pixel values of objects by averaging the pixel values of a plurality of pixels which belong to the objects at every object based on the pixel values of respective pixels of the original image and the label information stored in the frame memory 130. A frame memory 150 may store therein pixel values of all pixels of the original images corresponding to the respective objects after these pixel values were replaced with pixel values of respective objects. That is, the frame memory 130 may store therein a pixel value averaged image.

The image processing apparatus 100 may also include a motion detecting/averaging section 160 for detecting a motion of an original image at every area, e.g. at every pixel from the pixel values of the respective pixels of the original image and the label information stored in the frame memory 130 and calculating motions of objects by averaging motions of areas contained in the objects at every object and a motion storage register 170 for storing therein respective object motions obtained at this motion detecting/averaging section 160.

An operation of the image processing apparatus 100 shown in FIG. 1 will be described.

An original image may be supplied to the image area dividing section 110 and thereby stored in the frame memory 111. Then, this image area dividing section 110 may obtain an outputted image comprising a plurality of areas having the pixels whose pixel values are all made the same within the areas by processing the original image stored in the frame memory 111.

This outputted image may be supplied to the object extracting section 120. This object extracting section 120 may extract sets of adjacent pixels having the same pixel value as objects by processing the above-mentioned outputted image. Then, based on the extracted results of the objects, the frame memory 130 may store therein information (label information) indicating a plurality of objects to which the respective pixels of the original image belong.

Also, the original image stored in the frame memory 111 and the label information stored in the frame memory 130 may be supplied to the pixel value averaging section 140. This pixel value averaging section 140 may obtain the pixel value of the object by averaging pixel values of a plurality of pixels belonging to the object at every object. Then, the frame memory 150 may store therein all pixel values of original images corresponding to the respective objects after these pixel values were replaced with pixels values of the respective objects.

Also, the original image stored in the frame memory 111 and the label information stored in the frame memory 130 may be supplied to the motion detecting/averaging section 140. Then, this motion detecting/averaging section 160 may detect the motion of the original image based on the original image stored in the frame memory 111 and one-frame-preceding image at every area, e.g. at every pixel, and may detect a motion of an object by averaging motions of areas contained in the objects. The motions of the respective objects thus calculated may be stored in the register 170.

Figure 2:
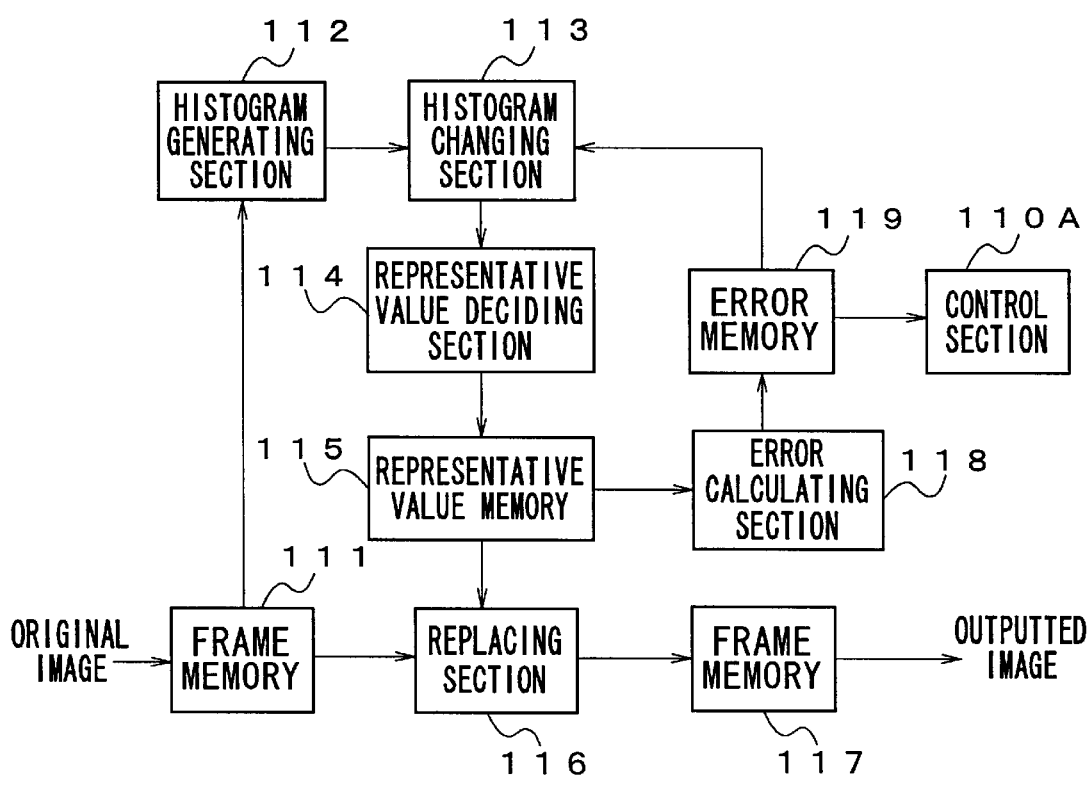
FIG. 2 is a block diagram showing an example of an arrangement of an image area dividing section.

FIG. 2 shows an example of an arrangement of the image area dividing section 110. This image area dividing section 110 may comprise a control section 110A, the frame memory 111, a histogram generating section 112, a histogram changing section 113, a representative value deciding section 114, a representative value memory 115, a replacing section 116, a frame memory 117, an error calculating section 118 and an error memory 119.

The frame memory 111 may store therein an inputted original image and may supply the original image to the histogram generating section 112, the replacing section 116 and further the pixel value averaging section 140 and the motion detecting/averaging section 160 shown in FIG. 1 in accordance with the requests issued from these sections. Incidentally, the inputted original image may comprise pixels formed of an RGB signal or a YUV signal, for example. Let us describe the present invention on the assumption that the original image may be comprised of pixels formed of the RGB signal. Assuming that each color signal component of R(red), G(green), B(blue) is expressed by 4 bits (16 gradations), then in this case, the kinds of pixel value (color) vectors comprising the original image may become equal to $16^3=4096$.

The histogram generating section 112 may generate a histogram indicating a frequency of pixel values used in the original image, and may output this histogram to the histogram changing section 113. That is, the histogram generating section 112 may detect frequencies of pixel values of a plurality of pixels comprising the original image for each of all available pixel values of the original image. In this case, a frequency $H(i)$ obtained when the pixel value vector is held at i may be detected by the equation (1). In this equation (1), $f(x, y)$ represents a pixel value of x-th pixel in the horizontal direction and y-th pixel in the vertical direction.

$$H(i) = \sum_{pix} \left\{ \begin{array}{ll} 0 & (f(x, y) \neq i) \\ 1 & (f(x, y) = i) \end{array} \right\} \quad (1)$$

The histogram changing section 113 may multiply the histogram inputted from the histogram generating section 112 and an error read out from the error memory 119, and may output the multiplied result to the representative value deciding section 114. That is, the histogram changing section 113 may obtain frequency related information corresponding to each of all available values of the original image by multiplying frequencies of pixel values of a plurality of pixels comprising the original image detected with respect to each of all available pixel values of the original image with errors corresponding to each pixel value at every corresponding pixel value. In this case, frequency related information $H'(i)$ obtained when the pixel value vector is i may be obtained by the equation (2). In this equation (2), di is the error corresponding to the pixel value vector i. The above-mentioned histogram generating section 112 and the above-mentioned histogram changing section 113 may constitute a frequency related information generating section.

$$H'(i) = H(i) \times di \quad (2)$$

The representative value deciding section 114 may decide a pixel value corresponding to frequency related information having the maximum value as a representative value based on inputted frequency related information, and may output this representative value to the representative value memory 115 comprising an accumulating section.

The replacing section 116 may obtain an output by replacing pixel values of respective pixels comprising the original image read out from the frame memory 111 with a representative value having the minimum error of at least one representative value stored in the representative value memory 115, and may store this outputted image in the frame memory 117. When the representative value memory 115 stores therein n representative values (C1, C2, ..., Ck, ... Cn), the pixel value $f(x, y)$ of x-th pixel in the horizontal direction of the original image and y-th pixel in the vertical direction may be replaced with f' (x, y) according to the equation (3). Incidentally, equalities of $f(x, y)=(r(x, y), g(x, y), b(x, y))$ and $Ck=(rk, gk, bk)$ are satisfied.

$$f'(x,y) = Ck \quad (3)$$

where k is k that may minimize the following equation:

$$\sqrt{(r(x, y) - rk)^2 + (g(x, y) - gk)^2 + (b(x, y) - bk)^2}$$

The error calculating section 118 may comprise an error information generating section. The error calculating section may obtain errors corresponding to the respective pixel values by errors between all available pixel values of the original image and the representative value read out from the representative value memory 115, and may output resultant errors to the error memory 119 as error information. For example, when the representative value memory 115 stores therein n representative values (C1, C2, ..., Ck, ... Cn), the error di corresponding to the pixel value vector i may be calculated by the equation (4). In this case, a distance between each of all available pixel values of the original image and a representative value having the minimum distance of the n representative values (C1, C2, ..., Ck, . . . Cn) may be detected as an error. Incidentally, equalities of i=(ri, gi, bi) and Ck=(rk, gk, bk) may be satisfied.

$$di = \min_{k} \sqrt{(ri-rk)^2 + (gi-gk)^2 + (bi-bk)^2} \quad (4)$$

The control section 110A may control operations of the above-mentioned respective sections. This control section 110A may control the histogram changing section 113, the representative value deciding section 114, the replacing section 116, the error calculating section 118 and the like such that these sections may be operated repeatedly until a predetermined condition is satisfied. For example, the control section 110A may control these sections such that these sections may execute the above-mentioned repetitive operation until the maximum value of errors corresponding to respective pixel values calculated by the error calculating section 118 may become less than a first threshold value.

Moreover, for example, the control section 110A may control these sections such that these sections may execute the above-mentioned repetitive operation until a total sum of errors corresponding to the respective pixel values calculated by the error calculating section 118 may become less than a second threshold value. Moreover, for example, the control section 110A may control these sections such that these sections may execute the above-mentioned repetitive operation until the maximum value of errors corresponding to the respective pixels values calculated by the error calculating section 118 may become less than the first threshold value and the total sum of the above-mentioned errors may become less than the second threshold value. Furthermore, for example, the control section 110A may control these sections such that these sections may execute the above-mentioned repetitive operation until the number of repetitive operations may become larger than a third threshold value.

The error memory 119 may store therein as initial values of errors corresponding to all available pixel values of the original image values whose influence (influence imposed when representative values are decided) imposed upon the frequency related information obtained by the histogram changing section 113 can be neglected. For example, the error corresponding to each of all pixel values stored in the error memory 119 as the initial value may be set to the same value, in this embodiment, 1.

Since the above-mentioned initial value is stored in the error memory 119, the histogram changing section 113 can output the frequency H(i) detected at the histogram generating section 112 as the frequency related information H'(i) without calculating the equation (2) when the above-mentioned respective sections execute the first operation of the above-mentioned repetitive operations. Therefore, in this case, the histogram changing section may generate the frequency related information H'(i) based on the pixel values of a plurality of pixels comprising the original image.

An operation of the image area dividing section 110 shown in FIG. 2 will be described with reference to a flowchart of FIG. 3.

Figure 4:
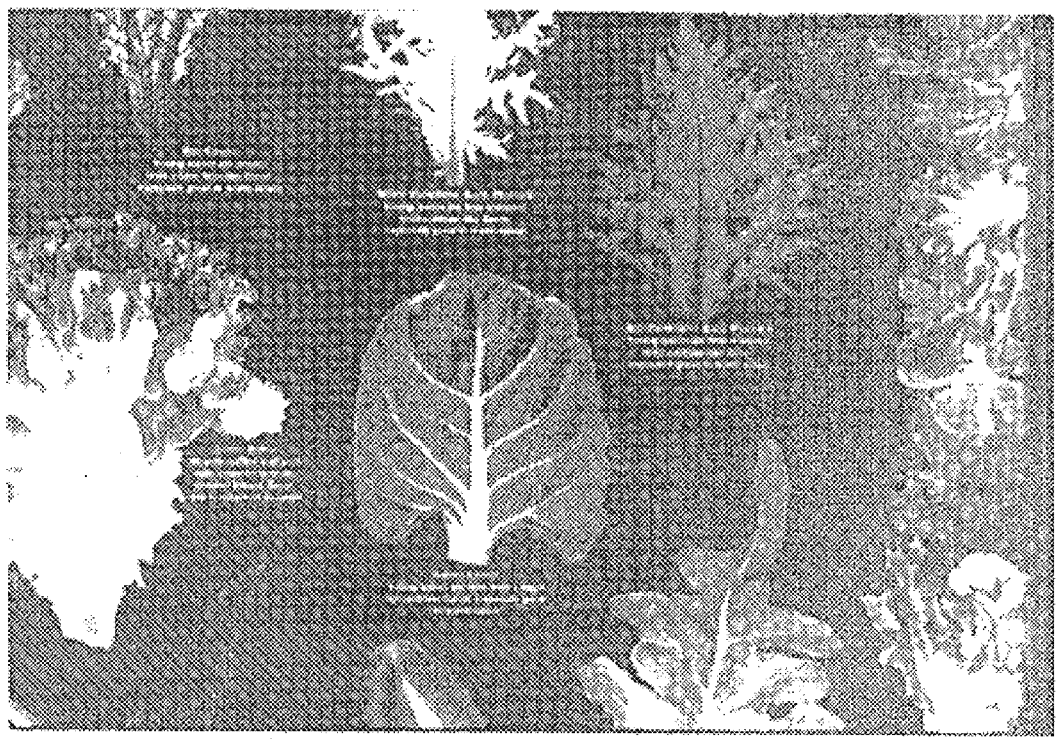
FIG. 4 is a diagram showing an original image.

At a step S1, the histogram generating section 112 may read out an original image shown in FIG. 4, for example, from the frame memory 111, may generate a histogram indicative of frequencies of pixel values of pixels used in the original image, and may output the histogram thus generated to the histogram changing section 113. That is, the histogram generating section 112 may calculate the equation (1). In FIGS. 5A to 5F, the transverse axis may have 9 scales in order to simplify the illustration, but the transverse axis, in actual practice, may have scales corresponding to the number of kinds of pixel values, e.g. 4096 scales in this embodiment.

The histogram changing section 113 may multiply the histogram inputted from the histogram generating section 112 with errors read out from the error memory 119, and may output multiplied results to the representative value deciding section 114 as frequency related information. Since 1 is already stored in the error memory 119 as all of the initial values of the errors corresponding to each of all available pixel value of the original image, the histogram changing section 113 may output the frequency H(i) detected by the histogram generating section 112 as the frequency related information H'(i).

Figure 5A:
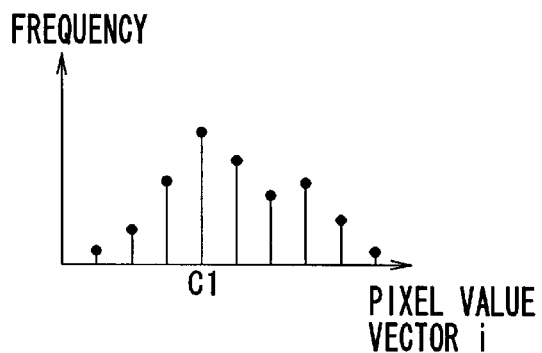
FIGS. 5A to 5F are diagrams to which reference will be made in explaining the processing executed by the image area dividing section.

At a step ST2, the representative value deciding section 114 may decide the pixel value corresponding to the frequency related information having the maximum value as a representative value based on the inputted frequency related information, and may output this representative value to the representative value memory 115. In this case, when the frequency related information shown in FIG. 5A is inputted, the representative value deciding section may decide a pixel value C1 as a representative value, and this pixel value may be stored in the representative value memory 115.

At a step S3, the replacing section 116 may obtain an outputted image by replacing pixel values of respective pixels comprising the original image read out from the frame memory 111 with a representative value having the minimum error of at least one representative value stored in the representative value memory 115, and may store this outputted image in the frame memory 117. That is, the replacing section 116 may calculate the equation (3). In that case, since there is only one representative value C1, the pxel values of all pixels of the original image may be replaced with the pixel value C1 and then stored in the frame memory 117.

Figure 5D:
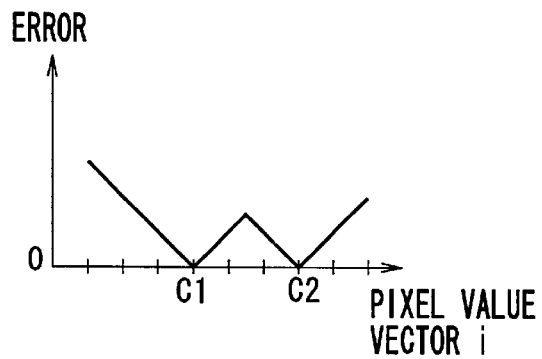
Figure 5B:
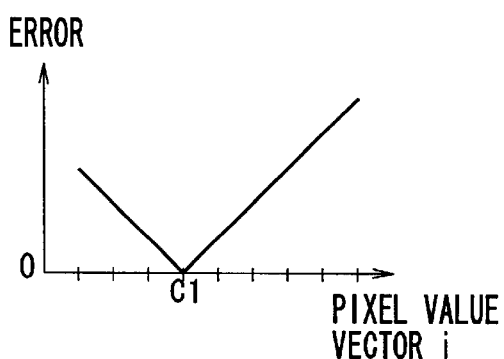

At a step S4, the error calculating section 118 may calculate errors corresponding to the respective pixel values by detecting errors between respective pixel values of all available pixel values of the original image and the representative values read out from the representative value memory 115, and may output this error to the error memory 119 as error information. That is, the error calculating section 118 may calculate the equation (4). In that case, as shown in FIG. 5B, the value of error corresponding to the pixel value C1 may be set to the minimum value 0.

At a step S5, it is determined by the control section 110A whether or not end conditions are satisfied. The end conditions may be such one that the maximum value of the errors corresponding to the respective pixels values may become less than the first threshold value as described above, or that the total sum of the errors corresponding to the respective pixel values may become less than the second threshold value or that the number of the repetitive operations may become greater than the third threshold value. Selection of the end conditions and setting of the threshold values may be executed in advance. If the end conditions are satisfied, then the control section 110A may stop the operations of the respective sections and may complete the area dividing processing. If on the other hand the end conditions are not satisfied, then control goes to a step S6.

At the step S6, the histogram changing section 113 may multiply the value of errors corresponding to the respective pixel values read out from the error memory 119 with frequencies corresponding to the respective pixel values of the histogram stored therein, and may output multiplied results to the representative value deciding section 114 as frequency related information. That is, the histogram changing section 113 may calculate the equation (2). In that case, the error shown in FIG. 5B may be read out from the error memory, and may be multiplied with frequencies corresponding to the respective pixel values of the histogram shown in FIG. 5A. Then, the histogram changing section may output multiplied results, i.e. frequency related information corresponding to the respective pixel values shown in FIG. 5C.

Next, control goes back to the step S2, whereat the representative value deciding section 114 may execute the processing similar to the above-mentioned processing. In that case, the representative value deciding section may decide a pixel value C2 as a representative value, and this representative value may be additionally stored in the representative value memory 115. Therefore, the representative value memory 115 may store therein two pixel values C1, C2 as the representative value.

At the step S3, the replacing section 116 may execute the processing similar to the above-mentioned processing. In that case, the pixel values of respective pixels of the original image may be replaced with the representative value having the minimum error of the pixel value C1 or the pixel value C2, and then stored in the frame memory 117.

At the step S4, the error calculating section 118 may execute the processing similar to the above-described processing. In that case, as shown in FIG. 5D, the values of the errors corresponding to the pixel values C1, C2 may be set to the minimum value 0.

At the step S5, the error calculating section 118 may execute the processing similar to the above-described processing. That is, the control section 110A may stop the operations of the respective sections to complete the area dividing processing if the end condition is satisfied. If on the other hand the end condition is not satisfied, then control goes to the step S6.

Figure 5E:
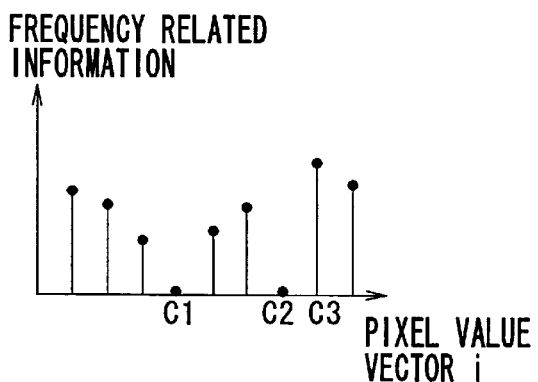
Figure 5C:
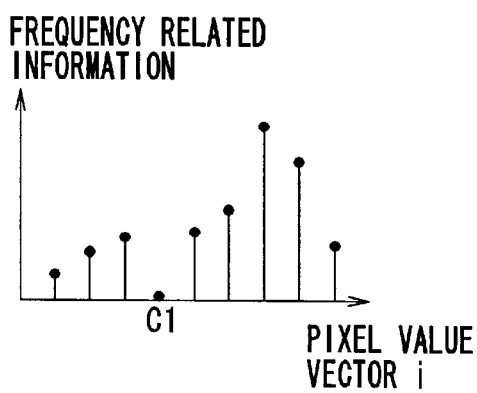
Figure 5F:
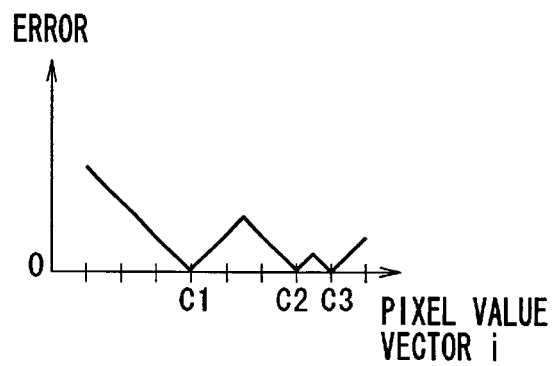

At the step S6, the histogram changing section 113 may execute the processing similar to the above-mentioned processing. In that case, since the error shown in FIG. 5D may be stored in the error memory 119 and the error memory may store therein the histogram shown in FIG. 5A, the frequency related information of respective pixel values shown in FIG. 5E are obtained as multiplied results. FIG. 5F shows errors corresponding to the frequency related information of FIG. 5E. A study of FIGS. 5B, 5D, 5F reveals that the maximum value or the total sum of the errors will decrease each time the processing of the steps S2 to S6 is repeated.

As described above, if it is determined by the control section 110A at the step S5 that the end condition is satisfied, then the area dividing processing in the image area dividing section 110 is ended. In this case, the frame memory 117 may store therein the outputted image comprising a plurality of areas in which the pixel values of the pixels within each area are made the same.

As described above, since the image area dividing section 110 may decide the representative value based on the frequency related information, may obtain the outputted image by replacing the pixel values of the pixels comprising the original image with the representative value and may obtain the new frequency related information by using the error, it is possible to accurately divide the area whose edges are not clear.

The object extracting section 120 shown in FIG. 1 will be described next. This object extracting section 120 may extract the sets of adjacent pixels having the same pixel value as objects by processing the outputted image stored in the above-mentioned frame memory 117. Then, this object extracting section 120 may store information (label information) indicating a plurality of objects to which the pixels of the original image belong in the frame memory 130 based on the object extracted result.

Figure 6:
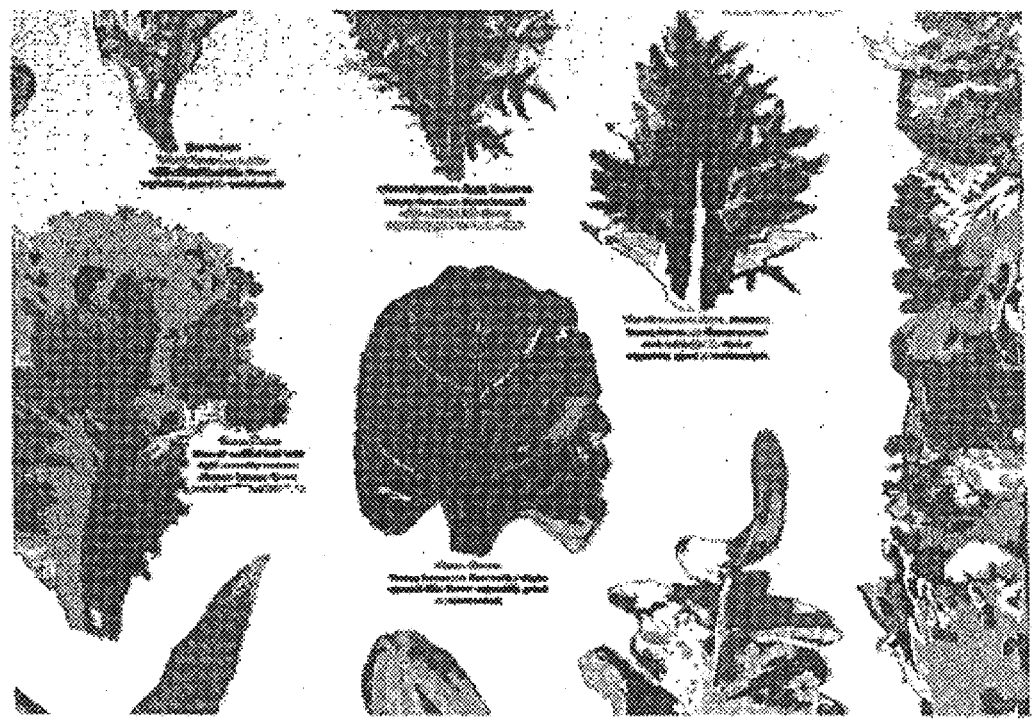
FIG. 6 is a diagram showing images corresponding to respective objects extracted by an object extracting section.

FIG. 6 shows an image indicating the respective objects extracted by this object extracting section 120. In FIG. 6, the image may be divided into 534 objects (areas). However, color tones may be changed in order to clearly illustrate the boundaries of the respective objects.

Figure 7:
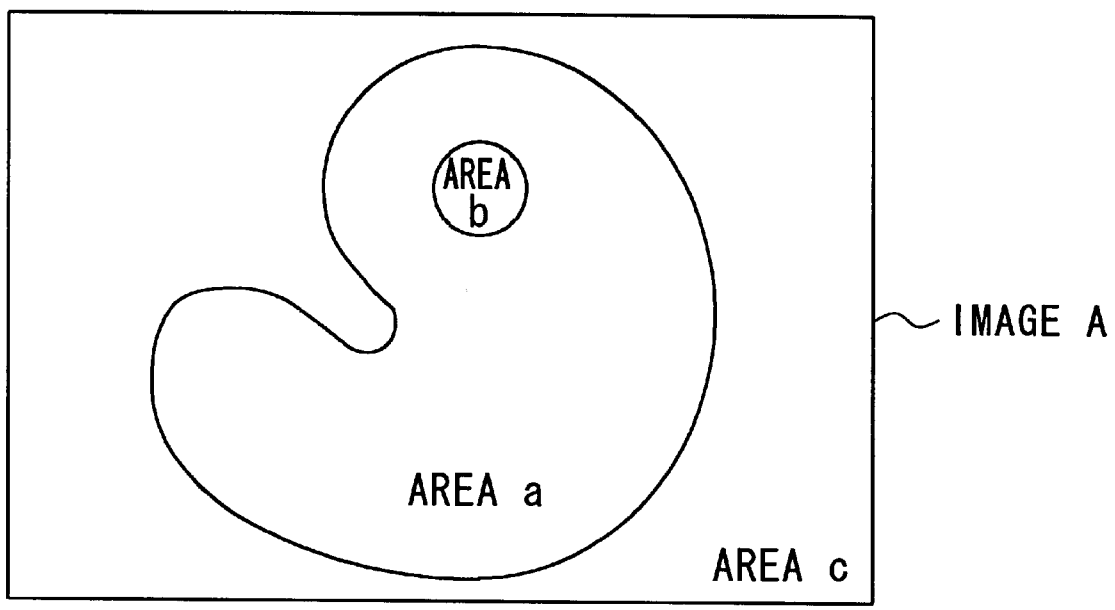
FIG. 7 is a diagram showing an example of a displayed image A.

With respect to the details of the object extracting processing executed by the object extracting section 120, the case in which an area a is extracted from an image A shown in FIG. 7 as an object will be described by way of example.

Figure 8:
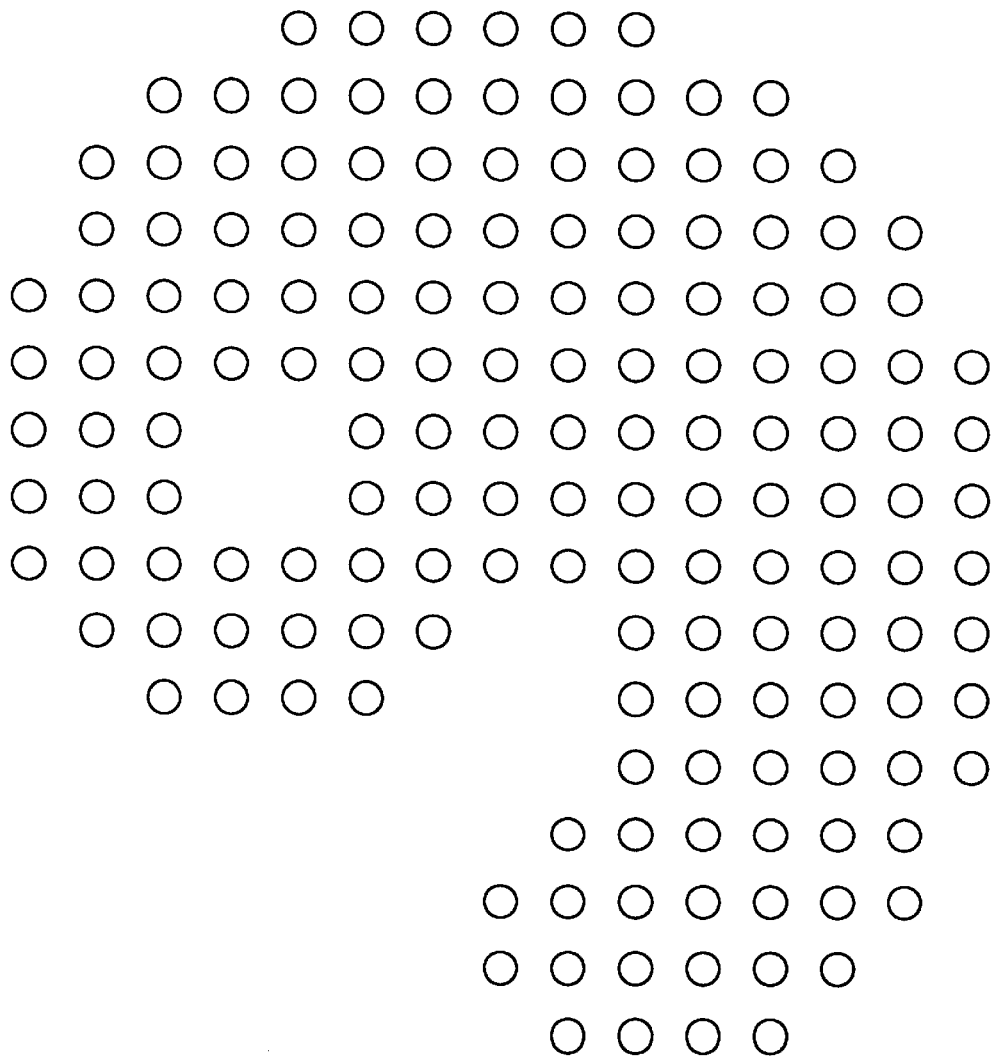
FIG. 8 is a diagram showing the manner in which pixels in an area a of the image A are arrayed.

Areas a to c of the image A may comprise a plurality of pixels, and respective pixels of the area a, for example may be located as shown in FIG. 8. Also, respective pixels of the areas a to c may hold different pixel values at every area.

Figure 9:
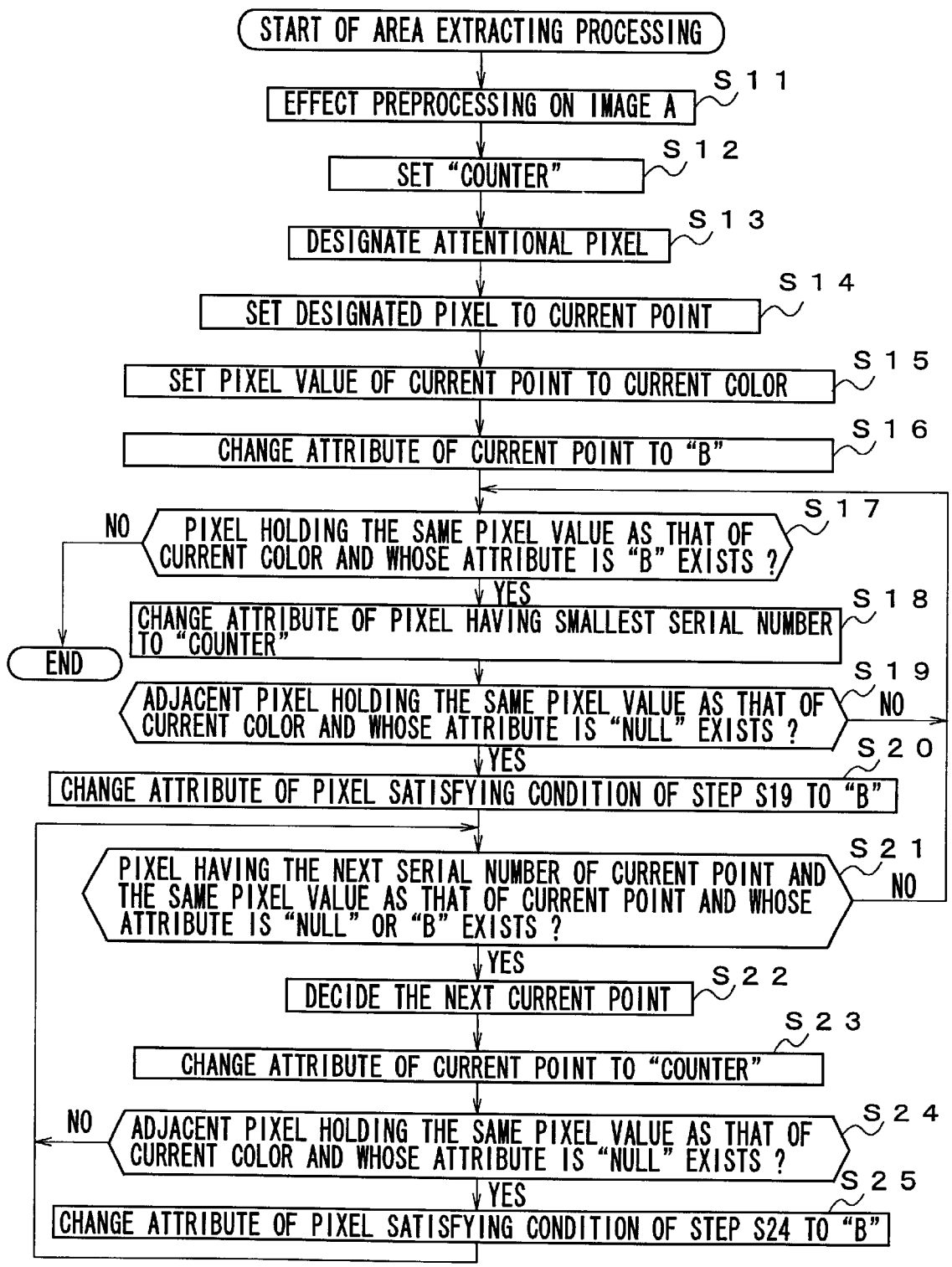
FIG. 9 is a flowchart to which reference will be made in explaining an area extraction processing.

FIG. 9 is a flowchart to which reference will be made in explaining a procedure for identifying the area a from the image A. When the outputted image stored in the frame memory 117 (see FIG. 2) is inputted, at a step S11, the object extracting section 120 may effect a preprocessing on the image A. Here, the object extracting section 120 may set attributes of respective pixels of the areas a to c of the image A which becomes an object of the area identification processing to "NULL" and may set serial numbers to all pixels.

Figure 10:
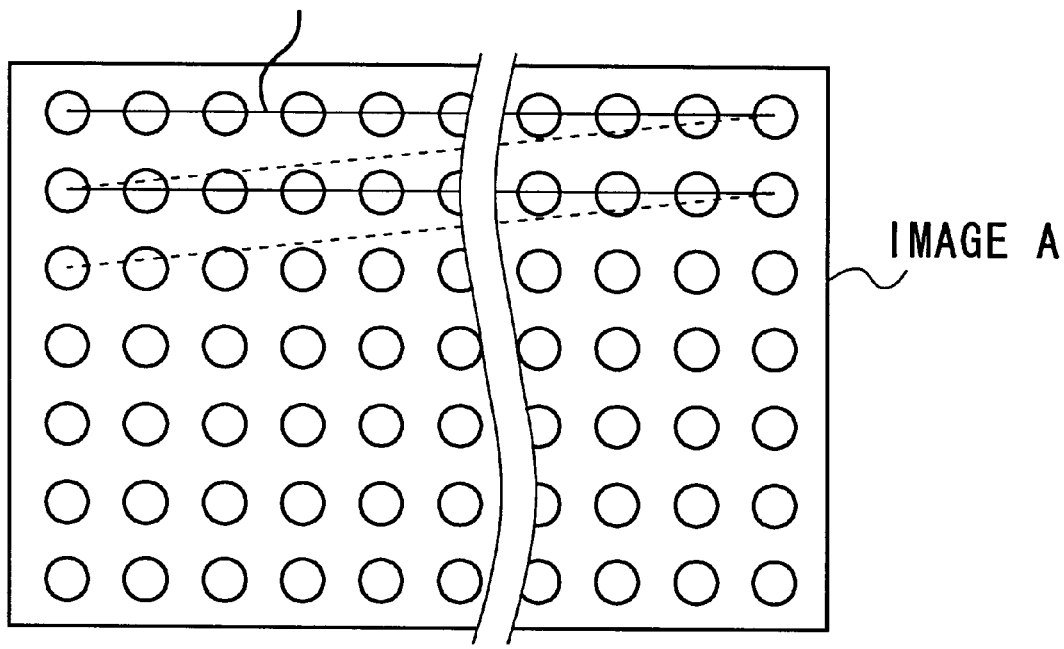
FIG. 10 is a diagram to which reference will be made in explaining the manner in which serial numbers are set.

In the case of this example, the serial numbers may be sequentially set to the pixels from the upper left end to the pixels of the right-hand direction of the image A as shown in FIG. 10. Next, the serial numbers may be further set to the pixel of the left end below one stage (line) to the pixels of the right-hand direction. If the serial numbers are set to all pixels of the image A, then the preprocessing is ended, and control goes to a step S12.

In the step S12, the object extracting section 120 may set a predetermined value (attribute) to "COUNTER" expressing an attribute that is to be set to a pixel of an identified area. While the value of "COUNTER" is set to the pixel of the area a in the following processing, the processing for setting the value of "COUNTER" to each pixel may be referred to as paint.

Figure 11:
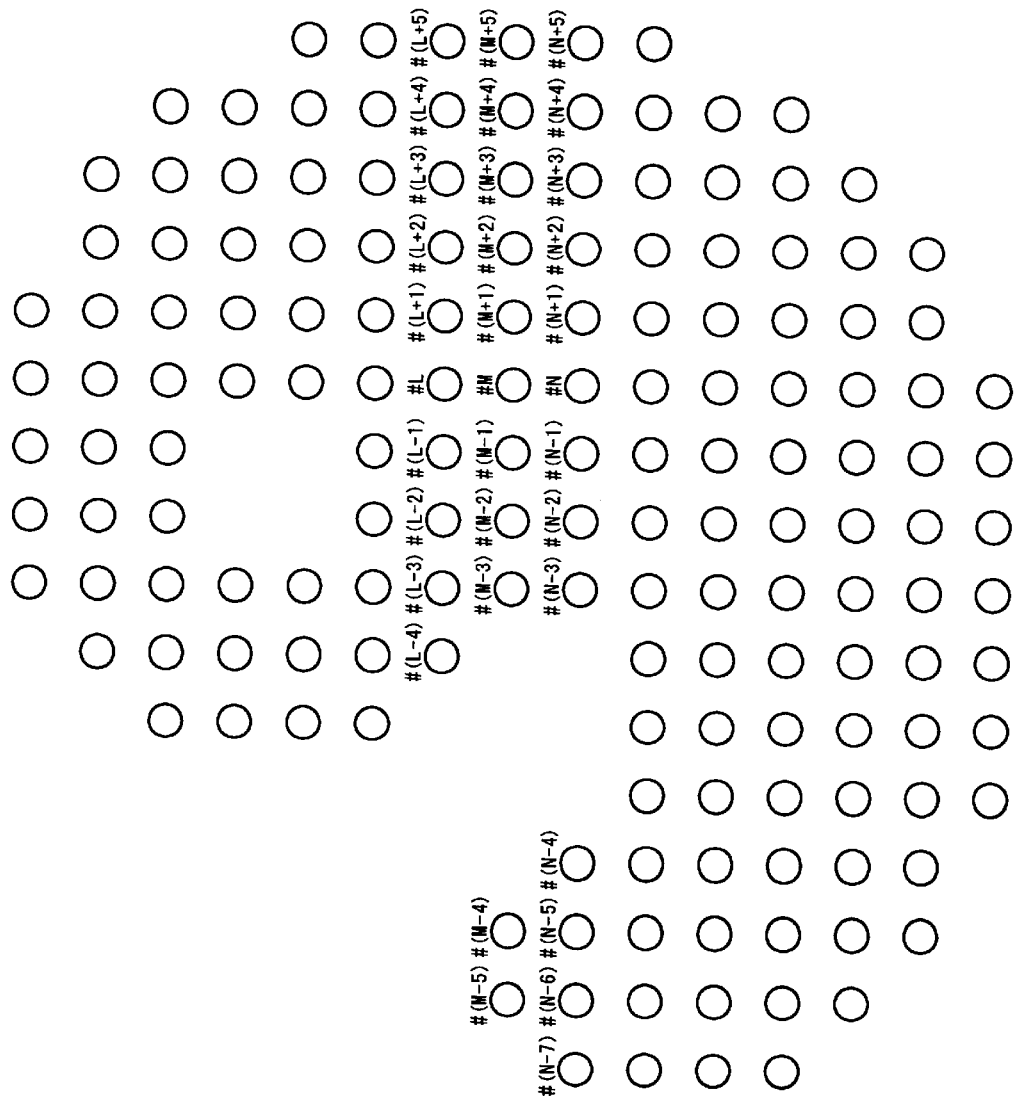
FIG. 11 is a diagram showing an example in which serial numbers of pixels in the area a of the image A are set.

In a step S13, the object extracting section 120 may designate arbitrary pixels of the image A in order to designate a recognized area (pixels contained in the area a are assumed to be designated in that case). At a step S14, the object extracting section 120 may set a designated pixel to a current point. At the next step S15, the object extracting section 120 may set a pixel value held by the pixel determined as the current point to a current color. For example, in that case, let it be assumed that pixels of serial numbers M (hereinafter referred to as "#M") of the area a shown in FIG. 11 are set to current points.

At the next step S16, the object extracting section 120 may change the attribute of the current point from "NULL" to "B". In that case, the attribute of the point of #M may be changed from "NULL" to "B".

It is determined at a step S17 by the object extracting section 120 whether or not the pixels of the image A have pixels having the same pixel value as that of the current color, i.e. pixels of the area a and whose attribute is "B". If there exist such pixels that can satisfy these conditions, then control goes to a step S18. In that case, the #M pixel can satisfy such conditions.

Figure 12:
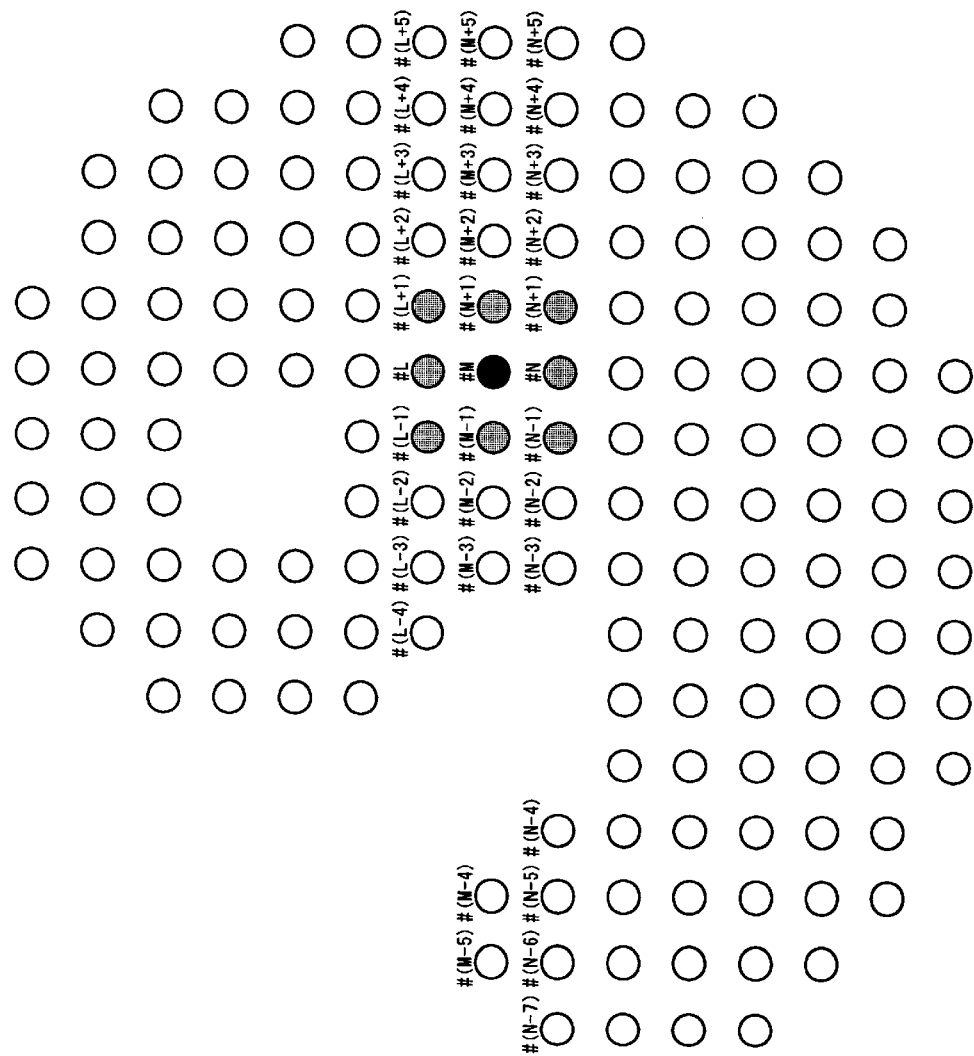
FIG. 12 is a diagram showing the situation in which pixels of the area a are painted.

At the step S18, the object extracting section 120 may select the pixel having the smallest serial number from the pixels that can satisfy the conditions at the step S17, and may set its attribute to "COUNTER". In that case, the attribute of the #M pixel may be changed from "B" to "COUNTER". Thus, as shown in FIG. 12, the #M pixel is painted in black, for example.

At the next step S19, it is determined by the object extracting section 120 whether or not 8 pixels adjacent to the current point (totally 8 pixels of two pixels adjacent in the vertical direction, two pixels adjacent in the horizontal direction and upper right adjacent pixel, lower right adjacent pixel, upper left adjacent pixel and lower left adjacent pixel, and these pixels will hereinafter be referred to as adjacent pixels) have adjacent pixels having the same pixel value as that of the current color and whose attribute is "NULL". If there exist such adjacent pixels that can satisfy these conditions, then control goes to a step S20.

In the step S20, the object extracting section 120 may change attributes of the adjacent pixels that can satisfy the conditions at the step S19 to "B". For example, in that case, as shown in FIG. 12, attributes of #(L−1) to #(L+1) pixels, #(M−1) pixel, #(M+1) pixel, #(N−1) to #(N+1) pixe may be changed to "B". The pixels whose attributes were changed to "B" are hatched (shown hatched) in FIG. 12.

It is determined at a step S21 by the object extracting section 120 whether or not there exists a pixel having a serial number next to the serial number of the current point, having the same pixel value as that of the current color and whose attribute was changed to "NULL" or "B". If there exists a pixel that can satisfy these conditions, then control goes to a step S22. In that case, the #(M+1) pixel can satisfy these conditions.

Figure 13:
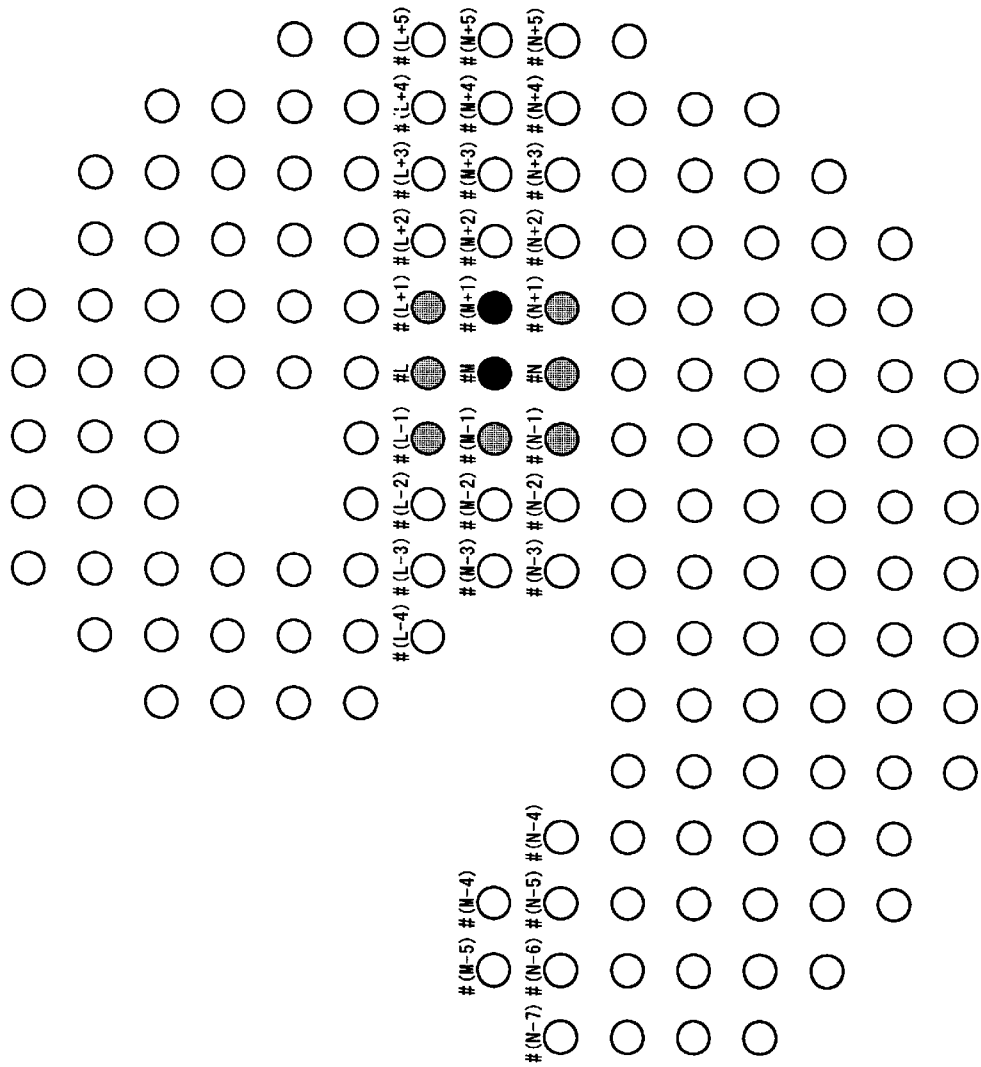
FIG. 13 is a diagram showing other situation in which the pixels of the area a are painted.

At the step S22, the object extracting section 120 may set the pixel which can satisfy the conditions at the step S21 to the next current point. At a step S23, the object extracting section 120 may change the attribute of that pixel to "COUNTER". In that case, as shown in FIG. 13, the #(M+1) pixel may be set to the new current point and may be painted in black.

At the next step S24, it is determined by the object extracting section 120 whether or not 8 adjacent pixels of the current points have pixels having the same pixel value as that of the current color and whose attribute is set to "NULL". If there exist adjacent pixels that can satisfy such conditions, then control goes to a step S25.

Figure 14:
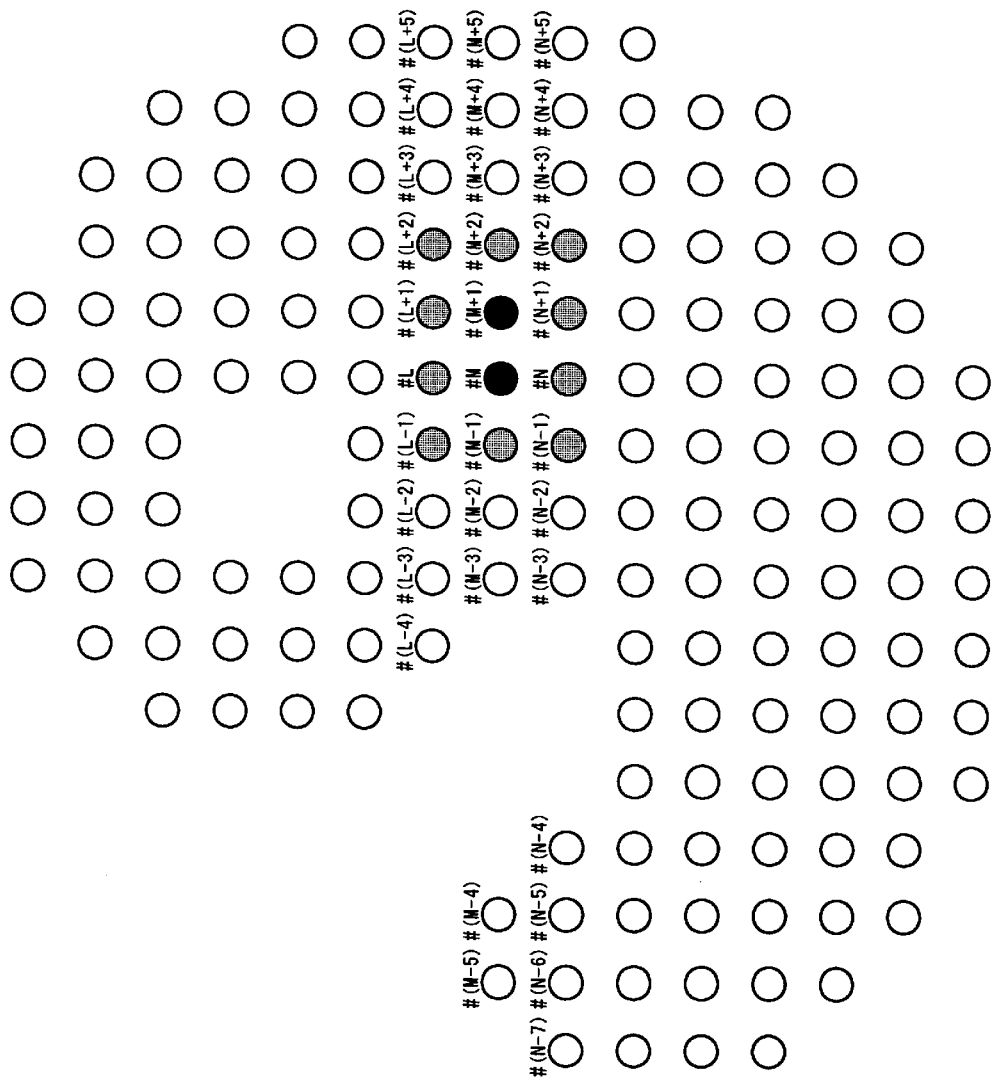
FIG. 14 is a diagram showing other situation in which the pixels of the area a are painted.

At the step S25, the object extracting section 120 may change the attributes of the adjacent pixels, which can satisfy the conditions at the step S24, to "B". For example, in that case, as shown in FIG. 14, of the adjacent pixels of the #(M+1) pixels, the attributes of the #(L+2) pixel, the #(M+2) pixel, the #(N+2) pixel are changed to "B".

At the completion of the processing of the step S25, control goes back to the step S21, and the steps S21 to S25 are executed repeatedly until the pixels which may satisfy the conditions at the step S21 may no longer exist.

If it is determined at the step S24 that the adjacent pixels of the current points do not have pixels having the same pixel value as that of the current point and whose attribute is set to "NULL", then control goes back to the step S21. If it is determined at the step S21 that there may not exist the pixel having the serial number next to the serial number of the current point and whose attribute is set to "NULL" or "B", then control goes back to the step S17. If it is determined at the step S19 that the adjacent pixels of the current points may not have the pixel holding the same pixel value as that of the current color and whose attribute is set to "NULL", then control goes back to the step S17.

Figure 15:
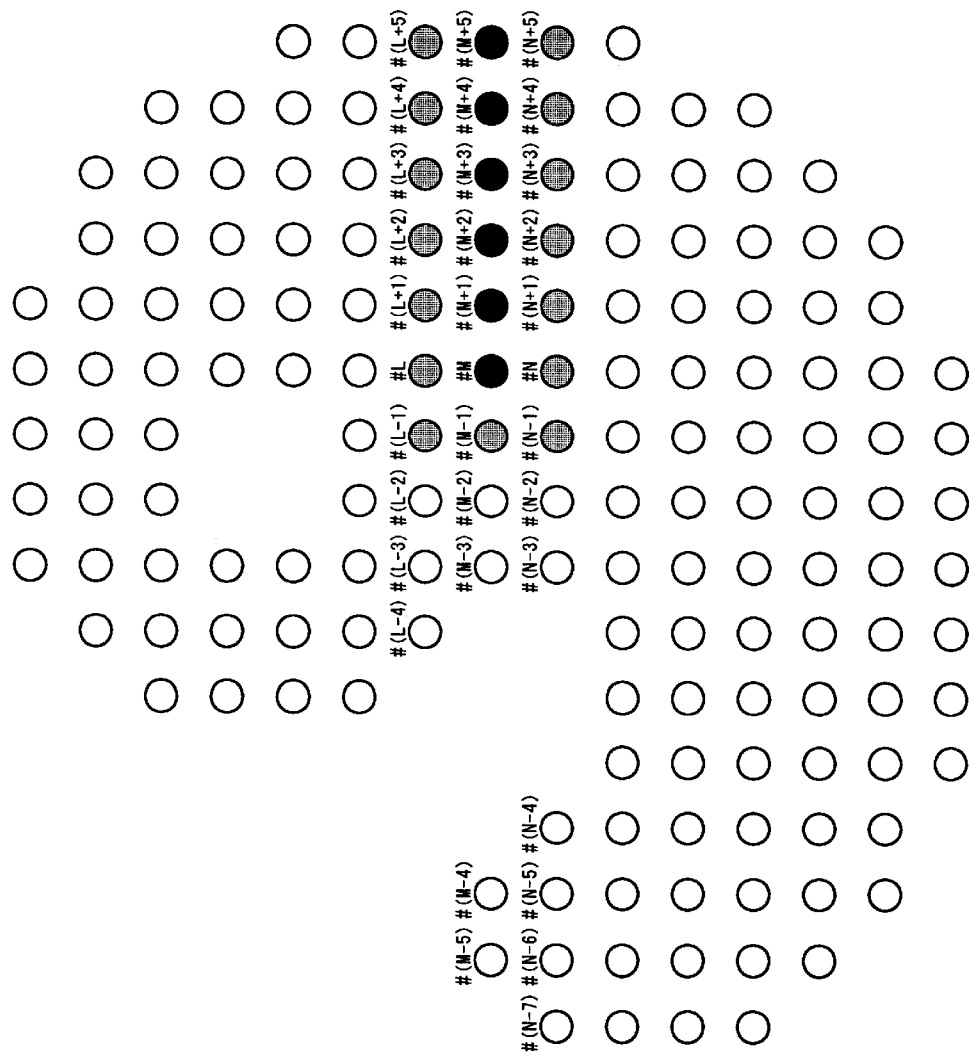
FIG. 15 is a diagram showing other situation in which the pixels of the area a are painted.

For example, when the #(M+5) pixel in the area a is set to the current point at the step S22 and its attribute is changed to "COUNTER" at the step S23 so that the above-mentioned pixel is painted in black as shown in FIG. 15, #(L+6) pixel, #(M+6) pixel, #(N+6) pixel, not shown, are pixels in the area c and the pixel values of these pixels are different from the current color (in that case, the pixel value held by the pixel in the area a). Also, the attributes of other adjacent pixels, i.e. #(L+4) pixel, #(L+5) pixel, #(N+4) pixel, #(N+5) pixel are "B", and the attribute of the #(M+4) pixel of other adjacent pixels is "COUNTER". That is, there may no longer exist adjacent pixels that can satisfy the conditions of the step S24.

Figure 16:
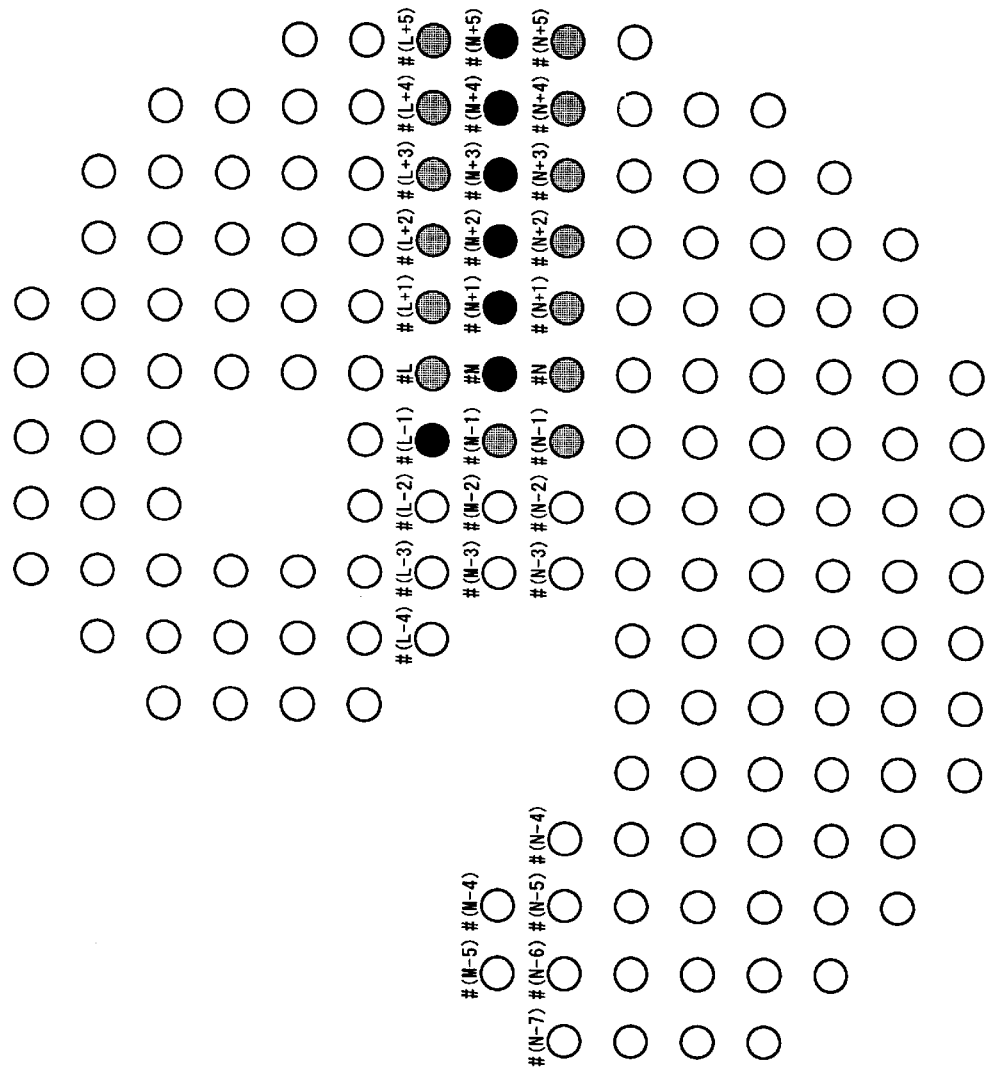
FIG. 16 is a diagram showing other situation in which the pixels of the area a are painted.
Figure 17:
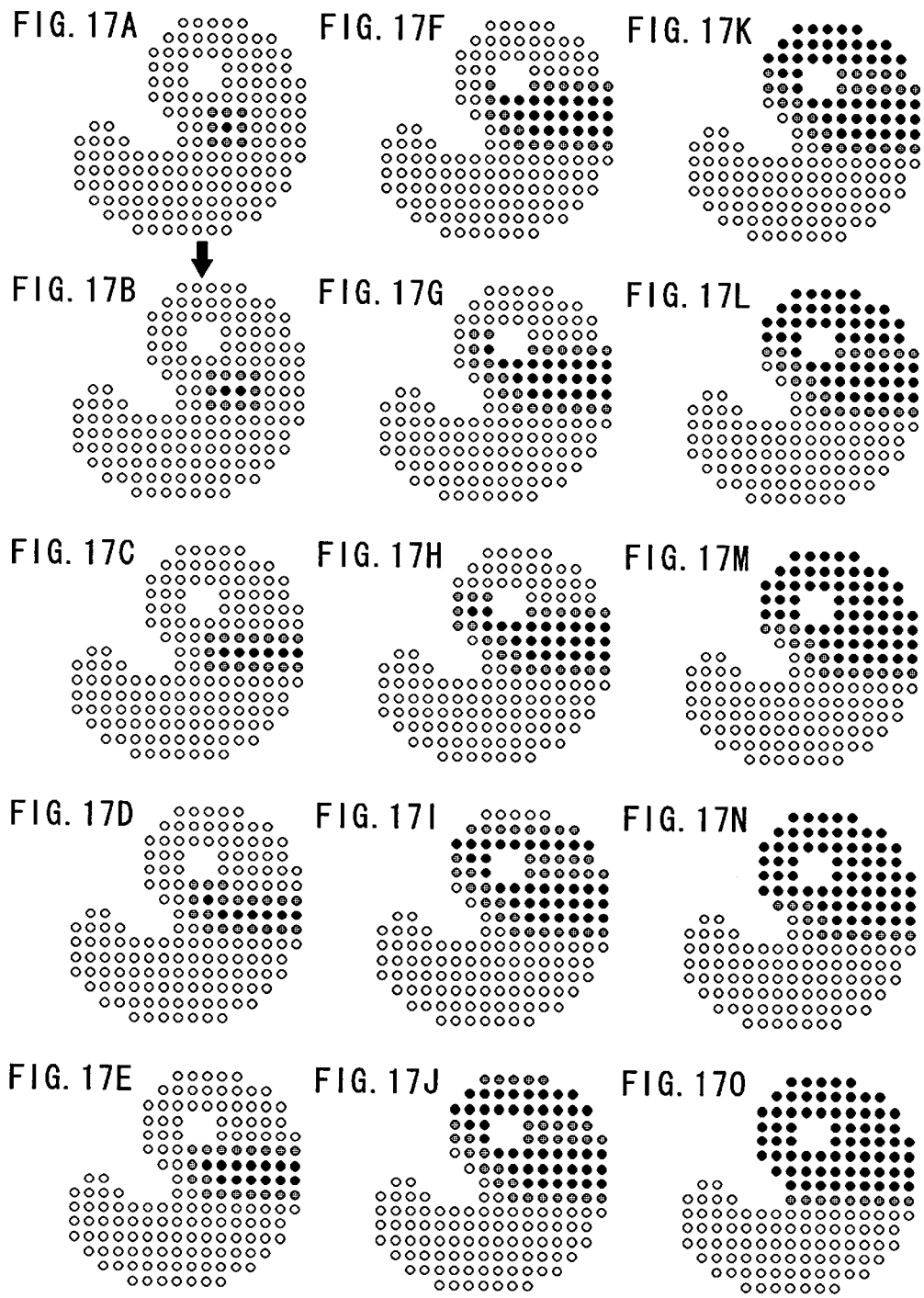
FIGS. 17A to 17O are diagrams showing the manner in which respective pixels of the area a are being painted progressively.
Figure 18:
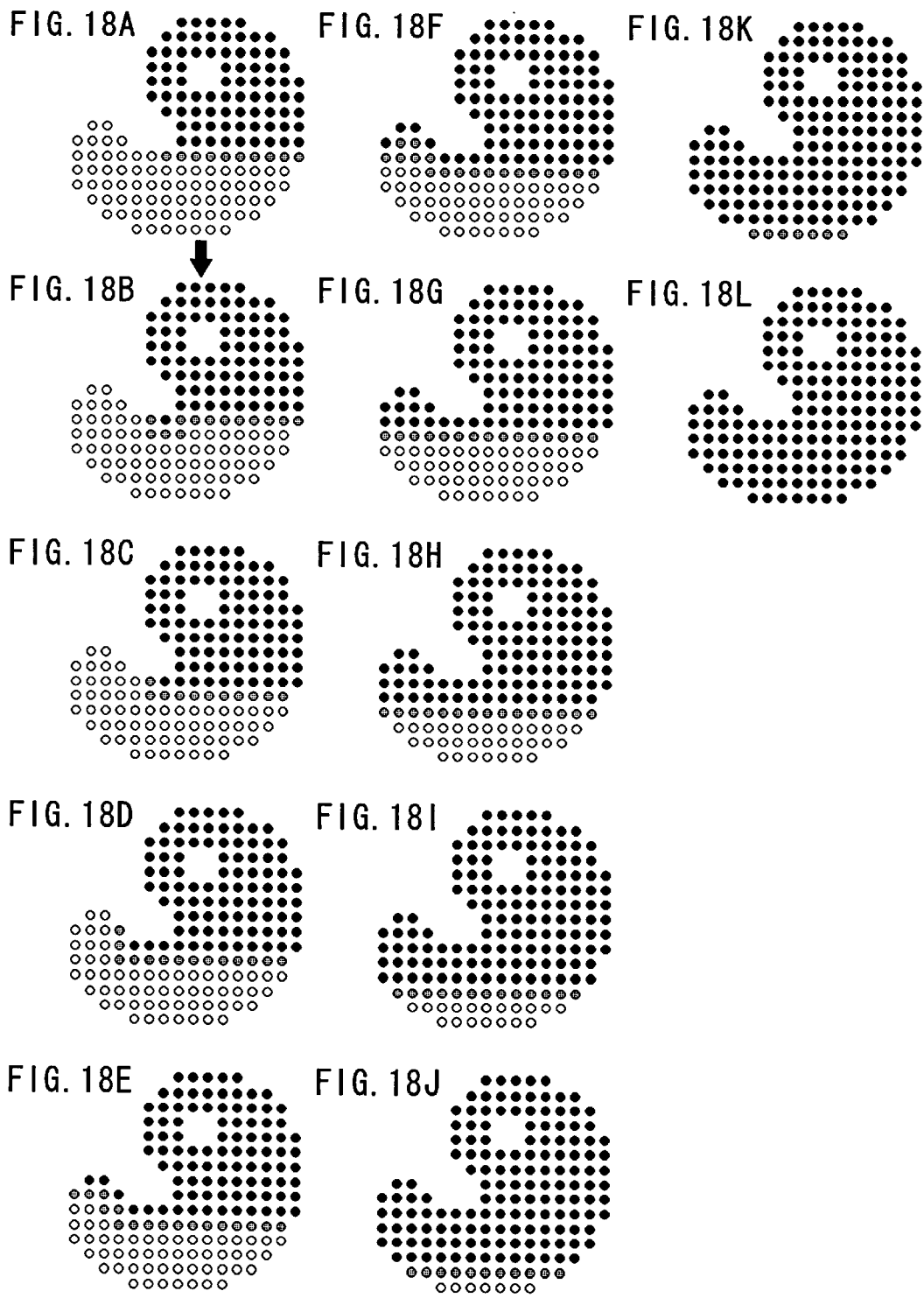
FIGS. 18A to 18L are diagrams showing the manner in which respective pixels of the area a are being painted progressively.

Therefore, control goes back to the step S21. However, since the #(M+6) pixel is the pixel in the area c and cannot satisfy the conditions of the step S21, control further goes back to the step S17. In that case, at the steps S17 and S18, the #(L−1) pixel is extracted and its attribute is changed from "B" to "COUNTER" so that the #(L−1) pixel is painted in black as shown in FIG. 16.

In this manner, when the steps S17 to S25 are executed repeatedly so that all pixels in the area a are painted, it is determined at the step S17 that the pixels of the image A do not have the pixel holding the same pixel value as the current color (pixel value held by the pixels in the area a) and whose attribute is set to "B". Then, control is ended.

FIGS. 17A to 17O and FIGS. 18A to 18L show the manner in which respective pixels in the area a of the image A are painted in black. In this manner, respective pixels in the area a are painted sequentially and thereby this area can be identified from other areas b and c. That is, the area a is extracted as the object.

If the number of pixels comprising the object (area) is below a predetermined number (e.g. 30 pixels), then such area cannot be regarded as the object. According to this arrangement, the number of objects can be suppressed from being increased, whereby the processing in the pixel value averaging section 140, the motion detecting/averaging section 160 and the like, for example, can be alleviated.

Figure 19:
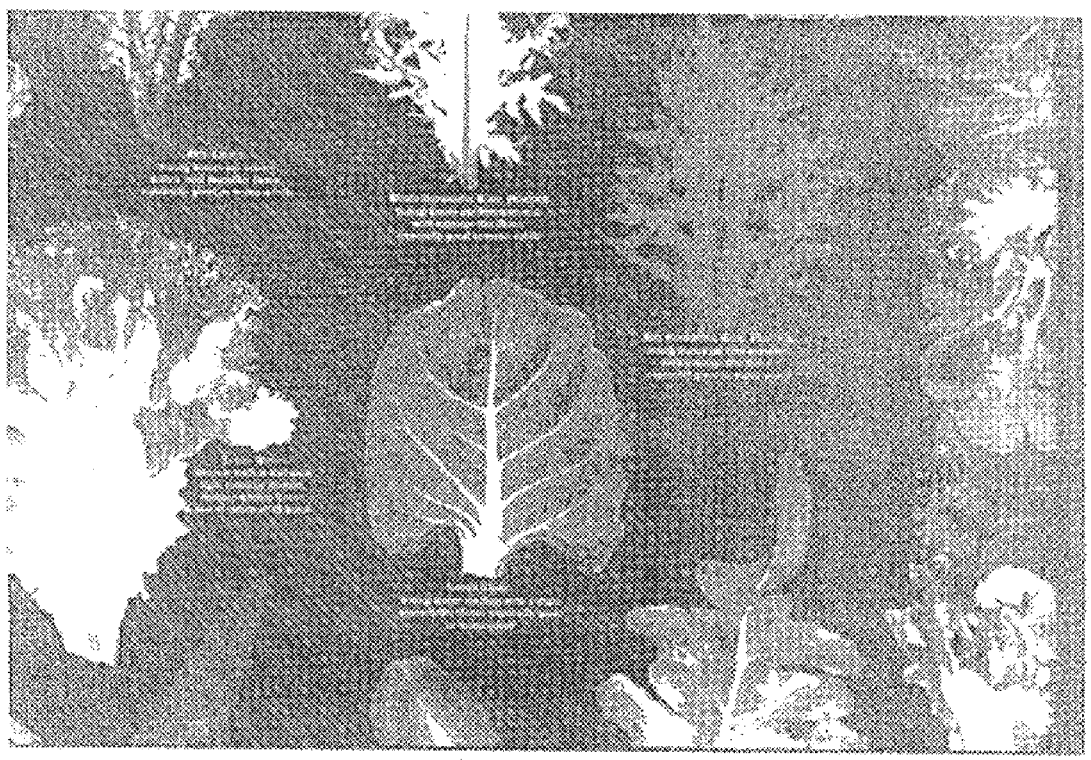
FIG. 19 is a diagram showing an image obtained by a pixel value averaging processing.

As described above, the original image stored in the frame memory 111 and the label information memorized in the frame memory 130 may be supplied to the pixel value averaging section 140 which then may obtain the pixel value of the object by averaging pixel values of a plurality of pixels belonging to such object. Then, pixel values of all pixels of the original image corresponding to each object may be replaced with the pixel values of respective objects and thereby stored in the frame memory 150. FIG. 19 shows a pixel value averaged image stored in the frame memory 150. Based on this image, it is possible to visually recognize that the object is properly extracted from the original image by the object extracting section 120.

The motion detecting/averaging section 160 will be described next. FIG. 20 shows an example of an arrangement of the motion detecting/averaging section 160. This motion detecting/averaging section 160 may comprise a frame memory 161, a corner detecting section 162, a corner memory 163, a motion detecting section 164, a motion memory 165 and a motion averaging section 166.

The frame memory 161 may store therein inputted original images and may output the stored original images to the motion detecting section 164. When an original image stored in the frame memory 111 (see FIG. 1) of the image area dividing section 110 is a J-frame image, an original image stored in the frame memory 161 is a (J−1) frame image which is one-frame-preceding image, for example. The corner detecting section 162 may detect corner portions from the original image read out from the frame memory 111 of the image area dividing section 110, and may store corner information in the corner memory 163 at every pixel of the image.

The motion detecting section 164 may detect a motion of every pixel of the original image read out from the frame memory 111 by using images of two frames read out from the frame memory 111 of the image area dividing section 110 and the frame memory 161. However, this motion detecting section 164 may read out information from the corner memory 163, may detect a motion of a pixel by effecting block-matching only on the pixels of the corner portions of the original image and may store a detected motion in the motion memory 165.

The motion averaging section 166 may obtain a motion of an object by averaging motions of areas contained in such object at every object by using label information (information indicating a plurality of objects to which respective pixels of original image belong) stored in the frame memory 130 (see FIG. 1) and the motion stored in the motion memory 165.

The processing in the motion detecting/averaging section 160 shown in FIG. 20 will be described next with reference to a flowchart of FIG. 21.

Figure 22:
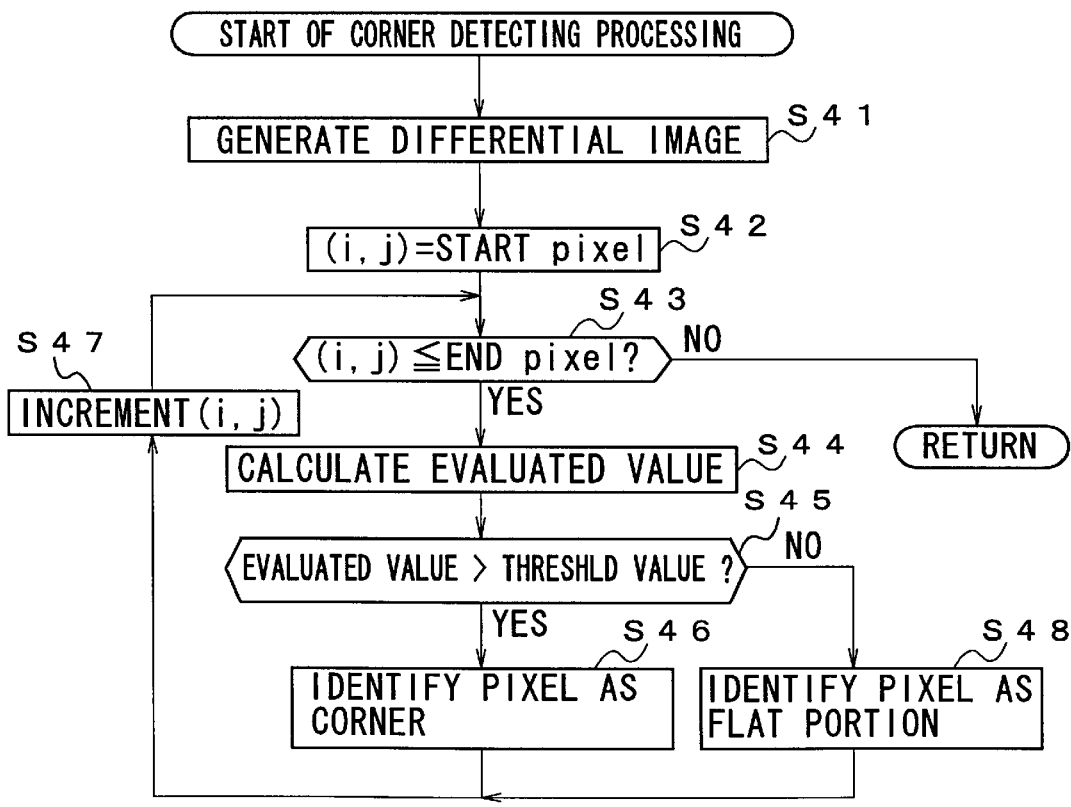
FIG. 22 is a flowchart to which reference will be made in explaining a corner detection processing.

At a step S31, the corner detecting section 162 may detect from the inputted image corner portions by which a motion can be accurately detected in block-matching. This corner detection processing will be described with reference to a flowchart of FIG. 22.

Figure 23:
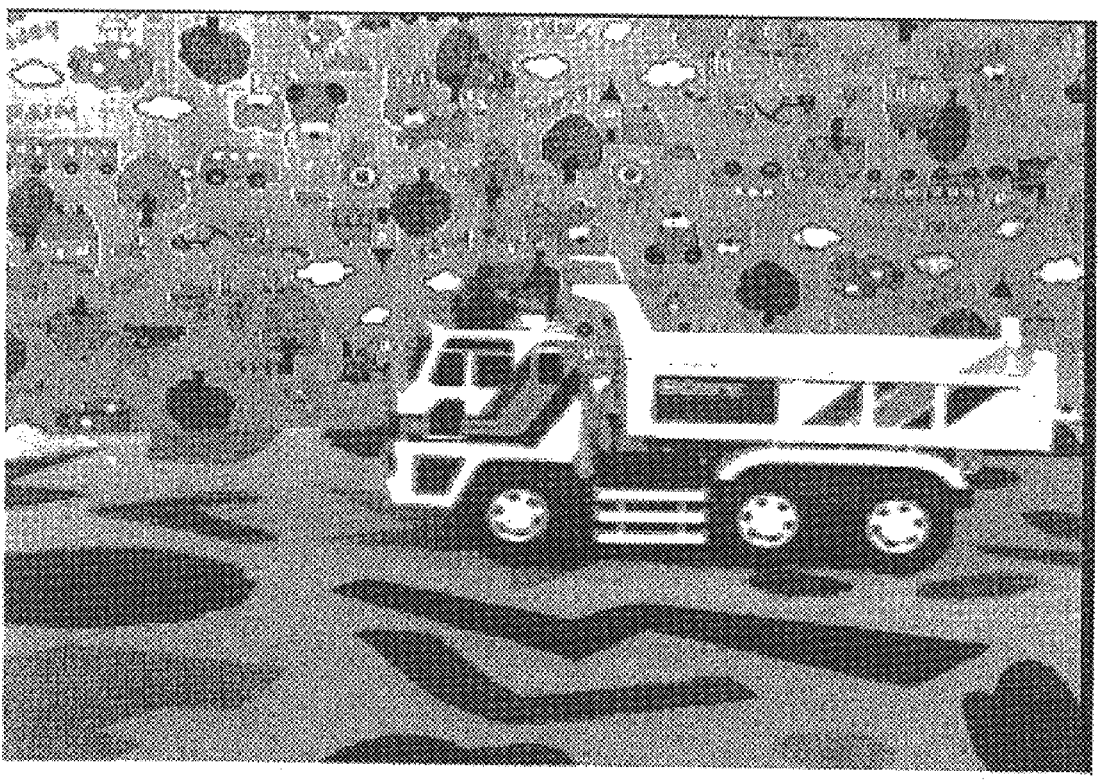
FIG. 23 is a diagram showing an image of an original frame.

At a step S41, the corner detecting section 162 may generate an x-direction differential image fx of an image f and a y-direction differential image fy by causing Sobel operators (FIGS. 24A, 24B) to act on the inputted image f(e.g. an image of a truck shown in FIG. 23).

Figures 24A, 24B, 25:
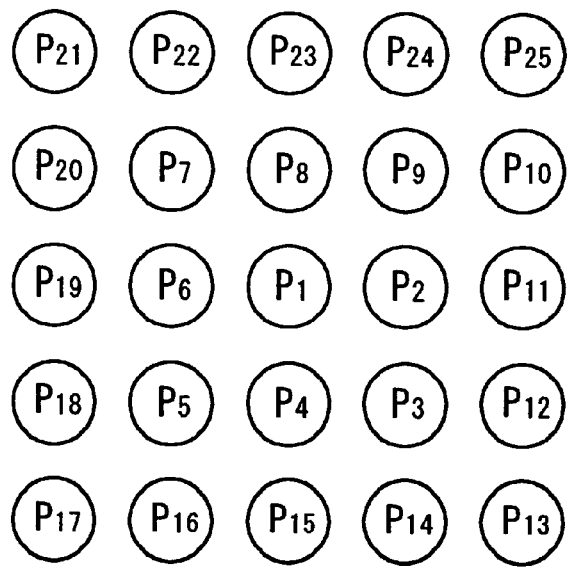
FIGS. 24A, 24B are diagrams showing Sobel operators.
FIG. 25 is a diagram showing the layout of pixels.

Specifically, the corner detecting section 162 may use all pixels of the image f as attentional pixels sequentially. Then, the corner detecting section may generate the x-direction differential image fx by using a total sum expressed as $$0{\times}P_1+2{\times}P_2+1{\times}P_3+0{\times}P_4-1{\times}P_5-2{\times}P_6-1{\times}P_7+0{\times}P_8+1{\times}P_9$$

of products of pixel values $P_1$ to $P_9$ of 9 (=3×3) pixels around its attentional pixel (e.g. the pixel $P_1$ in FIG. 25) and the corresponding values of the Sobel operator shown in FIG. 24A. In a like manner, the corner detecting section may generate the y-direction differential image fy by using a total sum expressed as $$0{\times}P_1+0{\times}P_2+1{\times}P_3+2{\times}P_4+1{\times}P_5+0{\times}P_6-1{\times}P_7-2{\times}P_8-1{\times}P_9$$

of products of the pixel values $P_1$ to $P_9$ of 9 pixels and the corresponding values of the Sobel operator shown in FIG. 24B.

Figure 26A:
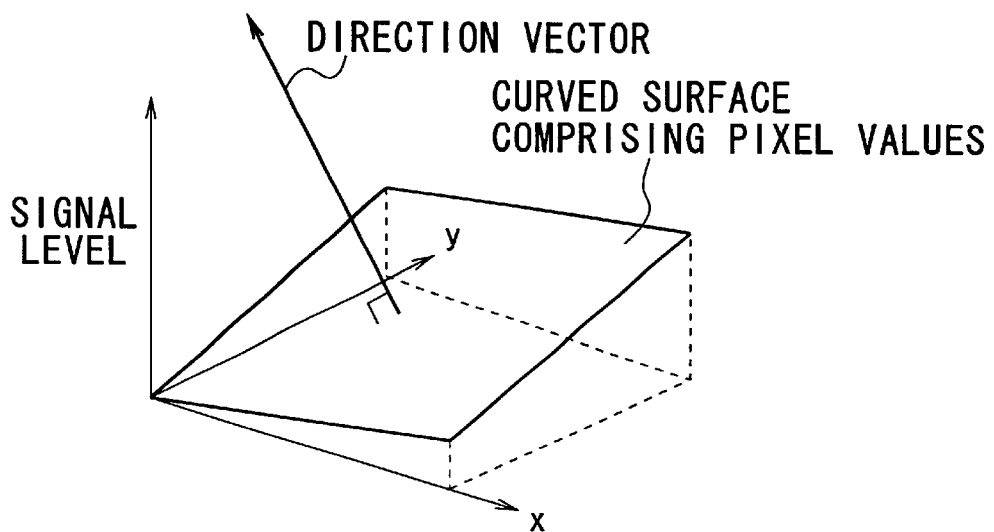
FIGS. 26A, 26B are diagrams to which reference will be made in explaining a direction vector having a maximum inclination.
Figure 26B:
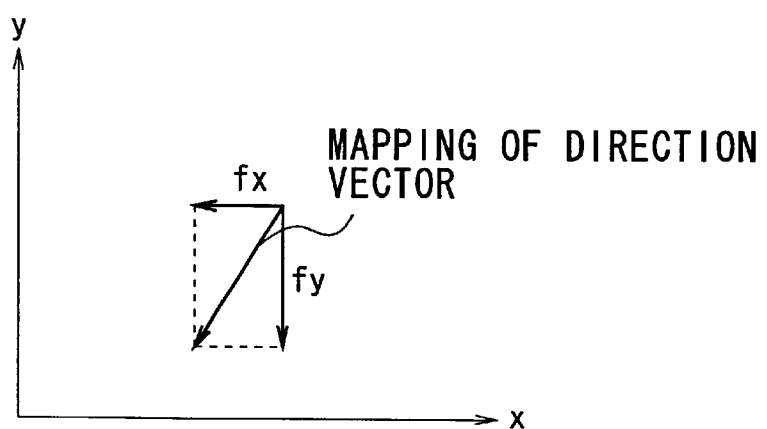

The differential images fx, fy will be described herein. Let us consider a vector (fx(x, y), fy(x, y)) comprising an x component and a y component including a pixel value fx(x, y) of a pixel of the x-direction differential image fx corresponding to the pixel located at coordinates (x, y) of the image f and a pixel value fy of a pixel of the y-direction differential image fy. As shown in FIGS. 26A, 26B, this vector may be a mapping of a maximum inclination direction-vector (direction-vector perpendicular to a curved surface comprising lines of equal pixel values of the image f) of a pixel value (e.g. brightness) at the coordinates (x, y) of the image f on the xy plane.

Therefore, it may become possible to judge a flatness of pixel values in the vicinity of the coordinates (x, y) of the image f by using a value of fx(x, y) fy(x+Δx, y+Δy)−fy(x, y) fx(x+Δx, y+Δy) of outer product of a vector (fx(x, y), fy(x, y)) corresponding to the pixel at the coordinates (x, y) of the image f and a vector (fx(x+Δx, y+Δy), fy(x+Δx, y+Δy)) corresponding to the pixel at the nearby coordinates (x+Δx, y+Δy)).

At a step S42, the corner detecting section 162 may initialize parameters (i, j) indicative of coordinates of a pixel to (0, 0) corresponding to a start pixel (pixel) where i=0 to xmax−1 (xmax is a transversal width of the image f) and j=0 to jmax−1 (max is a longitudinal width of the image f). Then, it is determined at a step S43 by the corner detecting section 162 whether or not the parameters (i, j) may exceed (xmax−1, jmax−1) corresponding to an end pixel. If it is determined by the corner detecting section that the parameter may not exceed (xmax−1, jmax−1), then control goes to a step S44.

At the step S44, the corner detecting section 162 may calculate an evaluated value comprising a total sum of absolute values of outer product of a vector (fx(i, j), fy(i, j)) corresponding to a pixel (e.g. pixel $P_1$ in FIG. 25) positioned at the coordinates (i, j) of the image f and vectors (fx(i+α, j+β), fy(i+α, j+β)) corresponding to nearby 24 pixels (pixels $P_2$ to $P_{25}$) in accordance with the following equation where α, β=−2 to 2.

Evaluated value=$\Sigma|fx(i, j){\cdot}fy(i+\alpha, j+\beta)-fy(i, j){\cdot}fx(i+\alpha, j+\beta)|$ If the vector corresponding to the pixel located at the coordinates (i, j) of the image f and the vectors corresponding to the nearby 24 pixels are all in parallel to each other, then the above-mentioned evaluated value may become null.

It is determined at a step S45 by the corner detecting section 162 whether or not the evaluated value that was calculated at the step S44 is greater than a previously-set threshold value. If it is determined by the corner detecting section that the evaluated value is greater than the threshold value, then control goes to a step S46.

At the step S46, the corner detecting section 162 may identify the pixel of the coordinates (i, j) of the image f as the corner portion, and may associate the coordinates (i, j) with the evaluated value and may store an associated result in the corner memory 163.

At a step S47, the corner detecting section 162 may increment the parameters (i, j) indicating the parameters such that the parameters may cope with the next pixel. Then, control goes back to the step S43, whereat the above-mentioned similar steps will be repeated.

If it is determined at the step S45 by the corner detecting section 162 that the evaluated value is not greater than the threshold value, then control goes to a step S48. At the step S48, the corner detecting section 162 may identify the pixel of the coordinates (i, j) of the image f as the flat portion, and may store such information in the corner memory 163.

Figure 27:
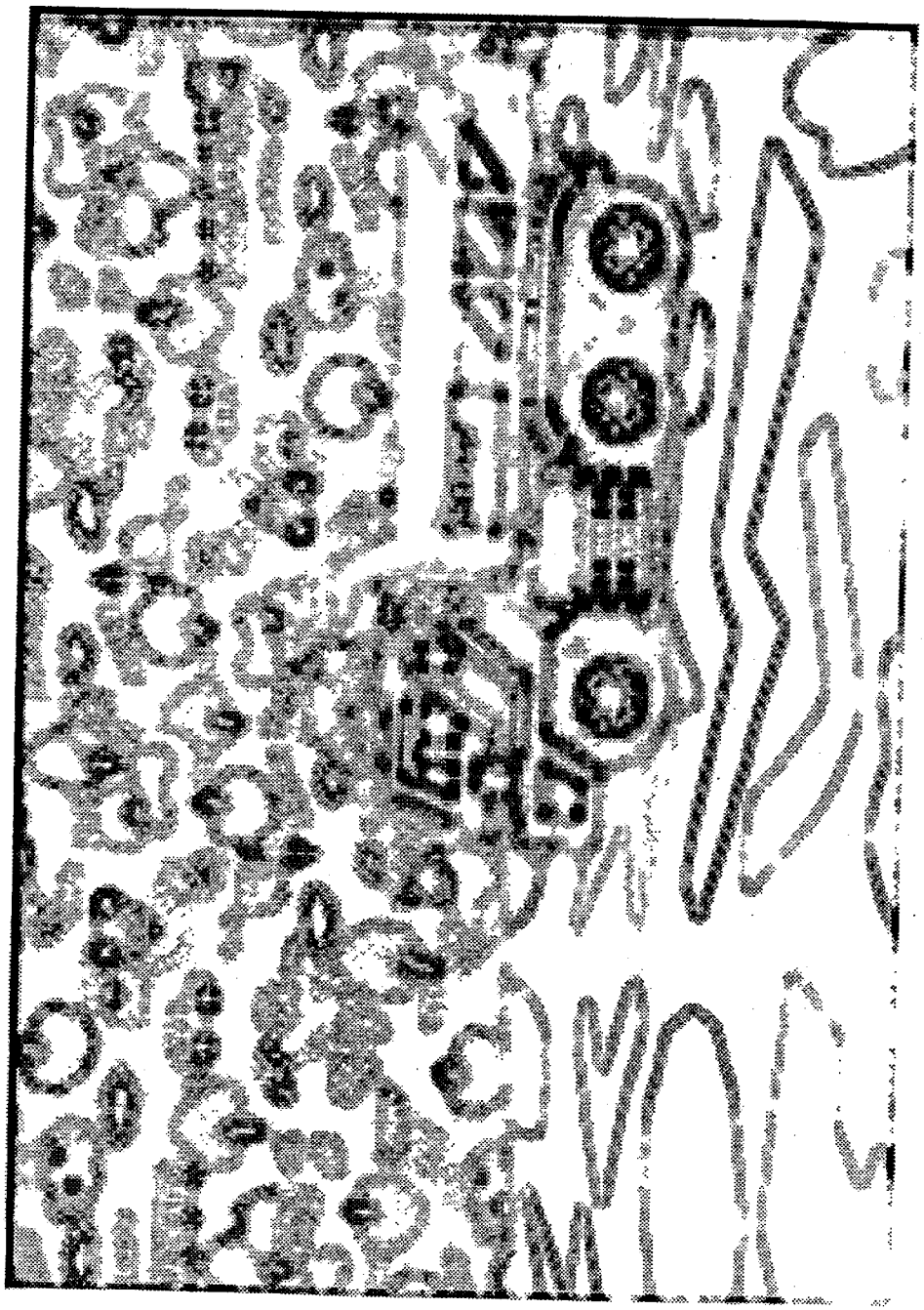
FIG. 27 is a diagram showing an image generated by using an evaluated value stored in a corner memory.
Figure 28:
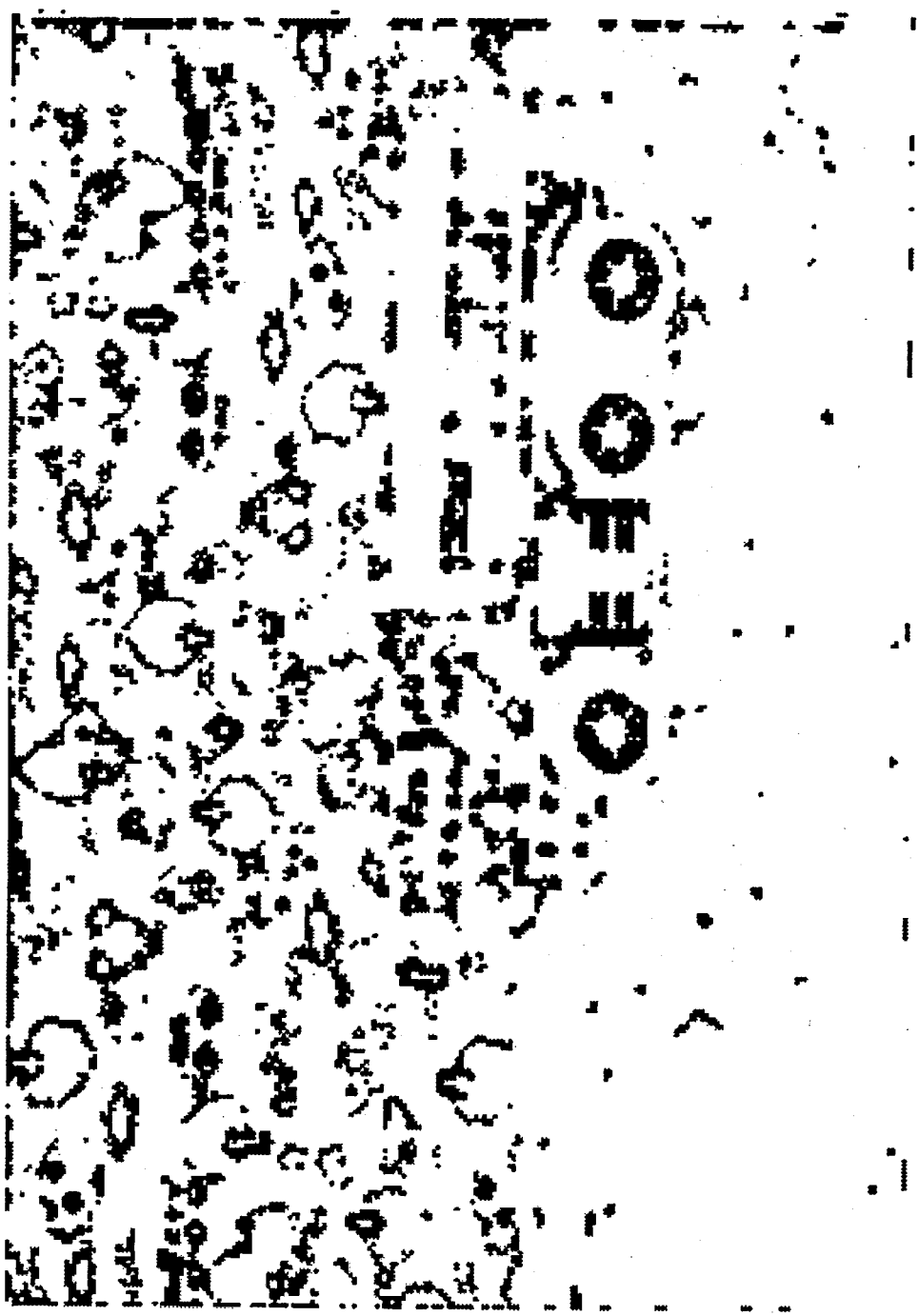
FIG. 28 is a diagram showing an image generated by using an evaluated value obtained after the evaluated value was converted into a binary evaluated value.

FIG. 27 shows an image that was obtained by using the evaluated value stored in the corner memory 163. A study of FIG. 27 reveals that the evaluated value which corresponds to only the corner portion of the original image may be stored in the corner memory 163. The corner memory 163 may store not only the evaluated value itself but also the evaluated value that was converted into the binary evaluated value. FIG. 28 shows an image obtained by using such binary evaluated value.

Figure 21:
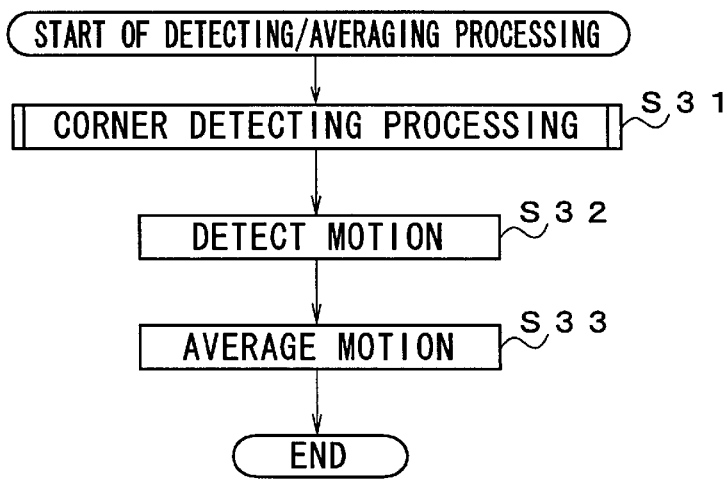
FIG. 21 is a flowchart to which reference will be made in explaining the processing executed by the motion detecting/averaging section.

If it is determined at the step S43 by the corner detecting section that the parameters (i, j) may exceed (xmax−1, jmax−1) corresponding to the end pixel, then control goes back to the step S32 of FIG. 21.

At the step S32, the motion detecting section 164 may effect block-matching on only the pixel identified as the corner portion of the original image read out from the frame memory 111 with reference to the evaluated value stored in the corner memory 163 in association with the coordinates such that the above-mentioned pixel may be matched with the one-frame-preceding image stored in the frame memory 161. Then, the motion detecting section may store a result of block-matching in the motion memory 165.

Then, at the step S33, the motion averaging section 166 may obtain a motion of an object by averaging motions of areas contained in the object at every object based on the label information (information indicating a plurality of objects to which respective pixels of original image belong) stored in the frame memory 130 (see FIG. 1) and motions stored in the motion memory 165, and may store obtained motion of the object in the register 170 (see FIG. 1).

In this manner, the motion detecting/averaging section 160 may detect motions except motions of the flat portion whose motion detection accuracy is expected to be low, and may detect a motion of each object by using only the detected motion. Therefore, the motion detecting/averaging section can detect the motion of each object at high accuracy. Moreover, since this motion detecting/averaging section 160 may detect motions excepting the flat portion, this motion detecting/averaging section can considerably reduce a time necessary for detecting motions as compared with the case in which a motion is detected by effecting block-matching on all pixels. Furthermore, since the motion detecting/averaging section can detect motions at every object as described above, the present invention can be applied to an image-compression using a motion compensation of object unit.

While the motion detecting section 164 in the motion detecting/averaging section 160 detects a motion at every area of one pixel by block-matching, the present invention is not limited thereto, and the motion detecting section may detect motions at every area of a plurality of pixels, for example.

Another example of an arrangement of the image area dividing section 110 will be described next.

Figure 29:
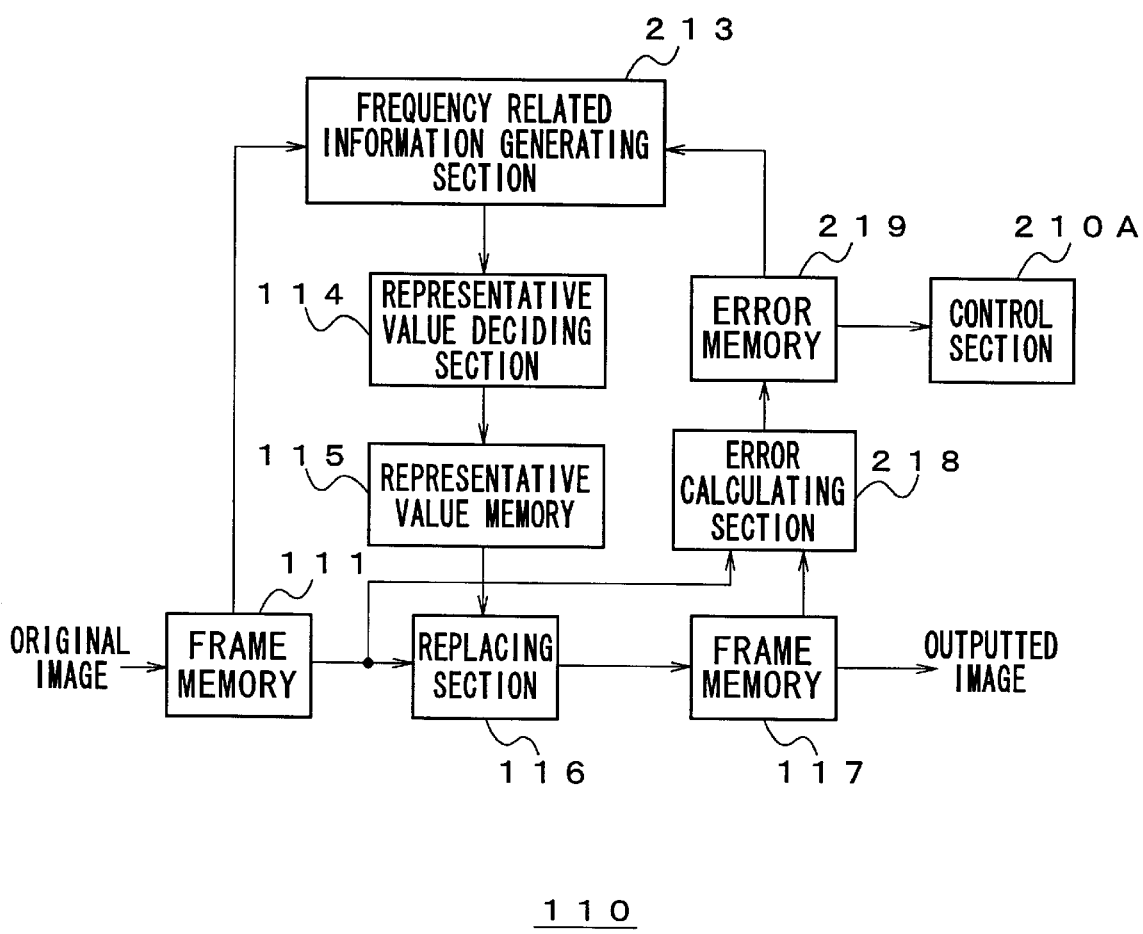
FIG. 29 is a block diagram showing another example of an arrangement of the image area dividing section.

FIG. 29 shows another example of an arrangement of the image area dividing section 110. In FIG. 29, elements and parts identical to those of FIG. 2 are marked with identical reference numerals, and therefore need not be described in detail.

This image area dividing section 110 may comprise a control section 210A, the frame memory 111, a frequency related information generating section 213, the representative value deciding section 114, the representative value memory 115, the replacing section 116, the frame memory 117, an error calculating section 218 and an error memory 219.

The frequency related information generating section 213 may generate frequency related information corresponding to each of all available pixel values of the original image by multiplying frequencies of pixel values used in the original image with errors corresponding to the pixel values, and may output the frequency related information to the representative value deciding section 114. In this case, frequency related information H'(i) obtained when the pixel value is held at i may be obtained by the equation (5). In this equation (5), f(x, y) represents a pixel value of x-th pixel in the horizontal direction and y-th pixel in the vertical direction, and d(x, y) represents errors corresponding to the pixel value f (x, y). The frequency related information generated by this frequency related information generating section 213 may become the same as that generated by the histogram changing section 113 of FIG. 2.

$$H'(i) = \sum_{pix} \begin{Bmatrix} 0 & (f(x, y) \neq i) \\ 1 & (f(x, y) = i) \end{Bmatrix} \times d(x, y) \quad (5)$$

The error calculating section 218 may comprise the error information generating section. This error calculating section may calculate errors of pixel values relative to pixels corresponding to the outputted image stored in the frame memory 117 at every pixel comprising the original image, and may output these errors to the error memory 219 as error information. For example, an error d(x, y) corresponding to the pixel value f(x, y) of an x-th pixel in the horizontal direction and a y-th pixel in the vertical direction may be obtained by the equation (6) where f(x, y)=(r(x, y), g(x, y), b(x, y)) and the pixel value of the outputted image corresponding to this pixel value f(x, y) may be f'(x, y)=(r'(x, y), g'(x, y), b'(x, y)).

$$d(x, y) = \sqrt{(r(x, y) - r'(x, y))^2 + (g(x, y) - g'(x, y))^2 + (b(x, y) - b'(x, y))^2} \quad (6)$$

The control section 210A may control operations of the above-mentioned respective sections. This control section 210A may control the frequency related information generating section 213, the representative value deciding section 114, the replacing section 116, the error calculating section 218 and the like such that these sections may be operated repeatedly until predetermined conditions may be satisfied. The predetermined conditions judged by this control section 210A may be similar to the predetermined conditions judged by the control section 110A of FIG. 2.

The error memory 219 may store therein a value whose influence to frequency related information can be neglected as an initial value of the error d(x, y) corresponding to the pixel value f(x, y) of each pixel comprising the original image. For example, the error d(x, y) stored in the error memory 219 as the initial value may be the same value, e.g. 1.

Since the above-mentioned initial value is stored in the error memory 219, the histogram changing section 113 can omit the multiplication of d(x, y) in the equation (5) upon first operation of the above-mentioned repetitive operations.

A rest of the image area dividing section 110 shown in FIG. 29 may be arranged similarly to the image area dividing section 110 shown in FIG. 2. Then, the image area dividing area 110 shown in FIG. 29 also can be operated similarly to the image area dividing section 110 shown in FIG. 2. Thus, finally, the frame memory 117 may store therein the outputted image comprising a plurality of areas in which the pixels within each area have the same pixel value.

Figure 3:
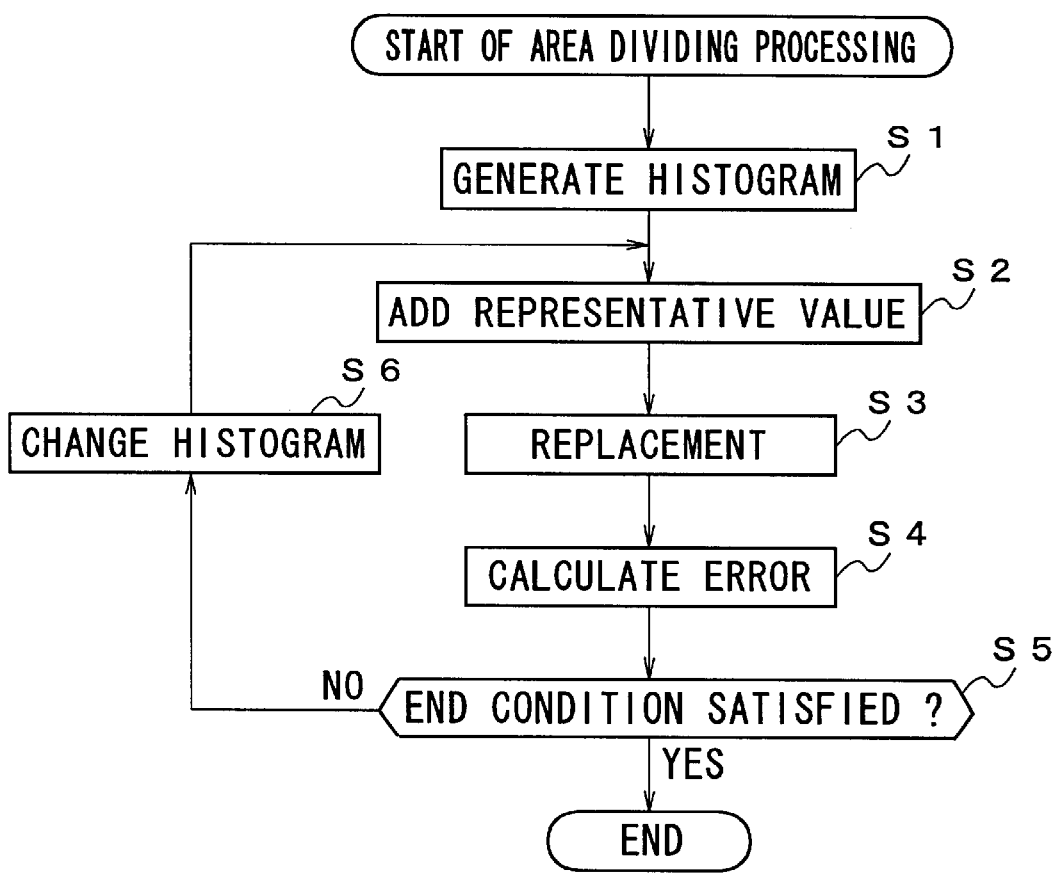
FIG. 3 is a flowchart to which reference will be made in explaining an operation of the image area dividing section.

Incidentally, the computer program used to execute each processing of FIG. 3 or the like can be supplied to a user through a provider medium composed of an information recording medium such as a magnetic disc or a CD-ROM and a network provider medium such as an internet or a digital satellite.

Also, while the original image is a color image as described above, the present invention can be similarly applied to the case in which an original image is a black-and-white image.

INDUSTRIAL APPLICABILITY

As described above, the image processing apparatus or the like according to this invention is for use with a case in which an image area is divided in order to extract an object from an image or to execute an image compression or the like using a motion compensation at every object, for example.

What is claimed is:
1. An image processing apparatus comprising:
   a frequency related information generating section for generating frequency related information relating to a frequency of each pixel value based on pixels values of a plurality of pixels comprising an original image and error information;

a representative value deciding section for deciding a representative value of pixel values based on said frequency related information;

an accumulating section for accumulating a representative value decided by said representative value deciding section;

a replacing section for replacing the pixel values of a plurality of pixels comprising said original image with said representative values accumulated in said accumulating section;

an error information generating section for generating error information representing an error between pixel values of respective pixels of an outputted image of said replacing section and pixel values of a plurality of pixels comprising said original image; and a control section for controlling said frequency related information generating section, said representative value deciding section, said accumulating section, said replacing section and said error information generating section such that these section may be operated repeatedly until a predetermined condition is satisfied.

2. An image processing apparatus as claimed in claim 1, wherein said predetermined condition is such one that a maximum value of errors contained in said error information becomes less than a threshold value.

3. An image processing apparatus as claimed in claim 1, wherein said predetermined condition is such one that the number of said repetitive operations becomes greater than a threshold value.

4. An image processing apparatus as claimed in claim 1, wherein said frequency related information generating section generates said frequency related information based on only pixel values of said plurality of pixels in the first operation of said repetitive operations, and generates said frequency related information based on both of the pixel values of said plurality of pixels and said error information in the operations following the first operation.

5. An image processing apparatus as claimed in claim 1, wherein said frequency related information generating section generates said frequency related information based on the pixel values of said plurality of pixels in the first operation of said repetitive operations on the assumption that influences of values of errors contained in said error information can be neglected.

6. An image processing apparatus as claimed in claim 5, wherein said frequency related information generating section outputs errors of the same value contained in said error information in the first operation of said repetitive operations.

7. An image processing apparatus as claimed in claim 6, wherein said same value is 1.

8. An image processing apparatus as claimed in claim 1, wherein said frequency related information generating section detects frequencies of pixel values of a plurality of pixels comprising said original image for each of all available pixel values of said original image and generates said frequency related information by multiplying said frequency with errors corresponding to respective pixel values contained in said error information.

9. An image processing apparatus as claimed in claim 8, wherein said error information generating section generates said error information by detecting errors between each of all available pixel values of said original image and representative values accumulated in said accumulating section.

10. An image processing apparatus as claimed in claim 9, wherein said error information generating section detects a distance, as said distance, between each of all available pixel values of said original image and a representative value having the shortest distance of the representative values accumulated in said accumulating section.

11. An image processing apparatus as claimed in claim 1, wherein the outputted image of said replacing section and said original image are inputted to said error information generating section, and said error information generating section generates said error information by detecting errors between pixel values or respective pixels of the outputted image inputted to said replacing section and pixel values of respective pixels of said original image.

12. An image processing apparatus as claimed in claim 1, wherein said representative value deciding section decides a pixel value corresponding to frequency related information having the largest value as a representative value.

13. An image processing apparatus as claimed in claim 1, wherein said replacing section replaces pixel values of respective pixels comprising said original image with a representative value having the minimum error of at least one representative value accumulated in said accumulating section.

14. An image processing apparatus as claimed in claim 1, wherein said error information generating section generates said error information based on representative values accumulated in said accumulating section and pixel values of all values.

15. An image processing apparatus according to claim 1, further comprising an extracting section for extracting an object from said original image based on the outputted image of said replacing section.

16. An image processing apparatus according to claim 15, further comprising a motion detecting section for detecting a motion of said original image at every area within said original image and an object motion detecting section for detecting a motion of said object based on a motion of an area contained within the object extracted by said extracting section.

17. An image processing apparatus as claimed in claim 16, wherein said area is comprised of one pixel or a plurality of pixels.

18. An image processing apparatus as claimed in claim 1, wherein said original image is a color image.

19. An image processing method comprising the steps of:

generating frequency related information related to frequencies of respective pixel values based on pixel values of a plurality of pixels comprising an original image and error information;

deciding a representative value of a pixel value based on said frequency related information;

accumulating said decided representative value;

replacing pixel values of a plurality of pixels comprising said original image with said accumulated representative values;

generating said error information indicative of errors between pixel values of respective pixels of an outputted image obtained by said replacement and pixel values of a plurality of pixels comprising said original image; and controlling said frequency related information generating step, said representative value deciding step, said representative value accumulating step, said representative value replacing step and said error information generating step such that said respective steps may be executed repeatedly until a predetermined condition is satisfied.

20. An image processing method as claimed in claim 19, wherein said predetermined condition is such one that a maximum value of errors contained in said error information becomes less than a threshold value.

21. An image processing method as claimed in claim 19, wherein said predetermined condition is such one that the number of said repetitive operations becomes greater than a threshold value.

22. An image processing method as claimed in claim 19, wherein said frequency related information generating step generates said frequency related information based on only pixel values of said plurality of pixels in the first operation of said repetitive operations and generates said frequency related information based on both of the pixel values of said plurality of pixels and said error information.

23. An image processing method as claimed in claim 19, wherein said frequency related information generating step generates said frequency related information based on the pixel values of said plurality of pixels in the first operation of said repetitive operations on the assumption that values of respective errors contained in said error information are values whose influences can be neglected.

24. An image processing method as claimed in claim 19, wherein said frequency related information generating step detects frequencies of pixel values of said plurality of pixels comprising said original image for each of all available pixel values of said original image and generates said frequency related information by multiplying said frequencies with errors corresponding to respective pixel values contained in said error information.

25. An image processing method as claimed in claim 24, wherein said error information generating step generates said error information by detecting errors between each of all available pixel values of said original image and said accumulated representative values.

26. An image processing method as claimed in claim 19, wherein said error information generating step generates said error information by detecting errors between pixel values of respective pixels of the outputted image obtained by said replacement and pixel values of respective pixels of said original image.

27. An image processing method as claimed in claim 19, wherein said representative value deciding step decides a pixel value corresponding to frequency related information having a maximum value as a representative value.

28. An image processing method as claimed in claim 19, wherein said representative value replacing step replaces pixel values of respective pixels comprising said original image with a representative value having a minimum error of at least said one accumulated representative value.

29. An image processing method as claimed in claim 19, wherein said error information generating step generates said error information based on said accumulated representative value and all pixel values.

30. An image processing method according to claim 19, further comprising a step of extracting an object from said original image based on the outputted image obtained by said replacement.

31. An image processing method according to claim 30, further comprising a step of detecting a motion of said original image at every area within said original image and a step of detecting a motion of said object based on a motion of an area contained within said extracted object.

32. An image processing method as claimed in claim 19, wherein said original image is a color image.

33. A recording medium readable by a computer and which has recorded thereon a program for enabling a computer to execute the steps of:

generating frequency related information related to frequencies of respective pixels based on pixel values of a plurality of pixels comprising an original image and error information;

deciding a representative value of a pixel value based on said frequency related information;

accumulating said decided representative value;

replacing the pixel values of said plurality of pixels comprising said original image with said accumulated representative values;

generating said error information for indicating errors between the pixel values of respective pixels of an outputted image obtained by said replacement and the pixel values of a plurality of pixels comprising said original image; and controlling said frequency related information generating step, said representative value deciding step, said representative value accumulating step, said representative value replacing step and said error information generating step such that these steps may be repeatedly executed until a predetermined condition is satisfied.

34. A recording medium readable by a computer as claimed in claim 33, wherein said program further enables said computer to execute a step of extracting objects from said original image based on the outputted image obtained by said replacement.

35. A recording medium readable by a computer as claimed in claim 34, wherein said program further enables said computer to execute a step of detecting a motion of said original image from every area within said original image and a step of detecting a motion of said object based on a motion of an area within said extracted object.

* * * * *